(12) United States Patent
Kalavade

(10) Patent No.: US 8,775,391 B2
(45) Date of Patent: Jul. 8, 2014

(54) SYSTEM AND METHOD FOR SHARING ANONYMOUS USER PROFILES WITH A THIRD PARTY

(75) Inventor: Asawaree Kalavade, Stow, MA (US)

(73) Assignee: Zettics, Inc., Concord, MA (US)

( * ) Notice: Subject to any disclaimer, the term of this patent is extended or adjusted under 35 U.S.C. 154(b) by 145 days.

(21) Appl. No.: 12/412,273

(22) Filed: Mar. 26, 2009

(65) Prior Publication Data

US 2009/0248680 A1    Oct. 1, 2009

Related U.S. Application Data

(63) Continuation-in-part of application No. 12/324,672, filed on Nov. 26, 2008, and a continuation-in-part of application No. 12/324,675, filed on Nov. 26, 2008, and a continuation-in-part of application No. 12/324,671, filed on Nov. 26, 2008, and a continuation-in-part of application No. 12/324,611, filed on Nov. 26, 2008.

(60) Provisional application No. 61/039,436, filed on Mar. 26, 2008.

(51) Int. Cl.
*G06F 17/00* (2006.01)
*G06F 7/00* (2006.01)

(52) U.S. Cl.
USPC .............. 707/694; 707/734; 707/784; 705/74

(58) Field of Classification Search
USPC .............................. 707/694, 734, 784; 705/74
See application file for complete search history.

(56) References Cited

U.S. PATENT DOCUMENTS

| | | | |
|---|---|---|---|
| 5,479,176 | A | 12/1995 | Zavrel, Jr. |
| 6,185,440 | B1 | 2/2001 | Barratt et al. |
| 6,229,486 | B1 | 5/2001 | Krile |
| 6,427,531 | B1 | 8/2002 | Chintawongvanich |

(Continued)

FOREIGN PATENT DOCUMENTS

| WO | WO-2009/070748 | 6/2009 |
|---|---|---|
| WO | WO-2009/120892 | 10/2009 |

OTHER PUBLICATIONS

International Search Report and Written Opinion issued for PCT/US2009/038443, dated May 27, 2009.

(Continued)

*Primary Examiner* — Yicun Wu
*Assistant Examiner* — Pavan Mamillapalli
(74) *Attorney, Agent, or Firm* — Wilmer Cutler Pickering Hale and Dorr LLP

(57) ABSTRACT

The invention provides a system and method for sharing anonymous user profiles with a third party. In one aspect of the invention, the system shares user profiles with content servers on a mobile data network so that they may select content responsive to the user's profile. The system provides a store of user profiles for associating profile information with either a source IP address or mobile phone number, where the profile includes information on the user and the user's network usage. The system detects a user's transaction request and inspects it for either an IP address or phone number, which it uses to retrieve the appropriate profile. The system subsequently applies predetermined opt-out policies to determine how much of the user profile may be provided in response to the profile request. The system then returns the profile information such that the user's identity is masked.

10 Claims, 32 Drawing Sheets

(56) References Cited

U.S. PATENT DOCUMENTS

| | | | |
|---|---|---|---|
| 6,442,529 B1 * | 8/2002 | Krishan et al. | 705/14.52 |
| 6,442,687 B1 * | 8/2002 | Savage | 713/156 |
| 6,611,867 B1 | 8/2003 | Bowman-Amuah | |
| 6,662,195 B1 | 12/2003 | Langseth et al. | |
| 6,757,543 B2 | 6/2004 | Moran et al. | |
| 6,834,195 B2 | 12/2004 | Brandenberg et al. | |
| 6,876,693 B2 | 4/2005 | Sim | |
| 6,894,994 B1 | 5/2005 | Grob et al. | |
| 6,943,732 B2 | 9/2005 | Gottl et al. | |
| 6,947,470 B2 | 9/2005 | Berens et al. | |
| 6,993,590 B1 | 1/2006 | Gauthier et al. | |
| 7,065,070 B1 * | 6/2006 | Chang | 370/352 |
| 7,080,139 B1 | 7/2006 | Briggs et al. | |
| 7,092,690 B2 | 8/2006 | Zancewicz | |
| 7,106,785 B2 | 9/2006 | Yoshida et al. | |
| 7,209,734 B2 * | 4/2007 | Maes | 455/414.1 |
| 7,213,032 B2 * | 5/2007 | Mascarenhas | 707/792 |
| 7,242,294 B2 | 7/2007 | Warrior et al. | |
| 7,257,546 B2 | 8/2007 | Ebrahimi et al. | |
| 7,260,370 B2 | 8/2007 | Wang et al. | |
| 7,328,262 B2 | 2/2008 | McDonagh et al. | |
| 7,340,438 B2 * | 3/2008 | Nordman et al. | 705/64 |
| 7,415,711 B2 * | 8/2008 | Chew et al. | 719/310 |
| 7,444,655 B2 | 10/2008 | Sardera | |
| 7,463,898 B2 * | 12/2008 | Bayne | 455/466 |
| 7,464,187 B2 | 12/2008 | Glommen et al. | |
| 7,505,765 B2 | 3/2009 | Frangione et al. | |
| 7,551,913 B1 * | 6/2009 | Chien | 455/411 |
| 7,590,547 B2 * | 9/2009 | Lagadec et al. | 705/307 |
| 7,660,581 B2 | 2/2010 | Ramer et al. | |
| 7,676,217 B2 | 3/2010 | Zhu et al. | |
| 7,689,432 B2 * | 3/2010 | Gross | 705/1.1 |
| 7,689,682 B1 | 3/2010 | Eldering et al. | |
| 7,698,422 B2 * | 4/2010 | Vanderhook et al. | 709/224 |
| 7,783,739 B1 | 8/2010 | Weigle | |
| 7,796,578 B2 | 9/2010 | Stafford | |
| 7,801,058 B2 | 9/2010 | Wang | |
| 7,856,248 B1 | 12/2010 | Fujisaki | |
| 7,865,187 B2 * | 1/2011 | Ramer et al. | 455/432.3 |
| 7,865,199 B2 | 1/2011 | Noldus | |
| 7,890,581 B2 * | 2/2011 | Rao et al. | 709/204 |
| 7,895,234 B2 * | 2/2011 | Lillie et al. | 707/784 |
| 8,032,564 B2 | 10/2011 | Muret et al. | |
| 8,433,804 B2 | 4/2013 | Swanburg et al. | |
| 2001/0036224 A1 * | 11/2001 | Demello et al. | 375/220 |
| 2002/0133488 A1 | 9/2002 | Bellis et al. | |
| 2002/0147766 A1 | 10/2002 | Vanska et al. | |
| 2002/0174073 A1 * | 11/2002 | Nordman et al. | 705/64 |
| 2003/0087652 A1 | 5/2003 | Simon et al. | |
| 2003/0126613 A1 | 7/2003 | McGuire | |
| 2003/0158855 A1 | 8/2003 | Farnham et al. | |
| 2004/0098625 A1 | 5/2004 | Lagadec et al. | |
| 2004/0122730 A1 * | 6/2004 | Tucciarone et al. | 705/14 |
| 2005/0164704 A1 | 7/2005 | Winsor | |
| 2005/0235030 A1 | 10/2005 | Lauckhart et al. | |
| 2005/0271016 A1 | 12/2005 | Kim et al. | |
| 2006/0026438 A1 * | 2/2006 | Stern et al. | 713/184 |
| 2006/0123105 A1 | 6/2006 | Parekh et al. | |
| 2006/0174028 A1 | 8/2006 | Zhu | |
| 2006/0184670 A1 | 8/2006 | Beeson et al. | |
| 2007/0008885 A1 | 1/2007 | Bonner | |
| 2007/0016918 A1 | 1/2007 | Alcorn et al. | |
| 2007/0088821 A1 | 4/2007 | Sankuratripati et al. | |
| 2007/0100653 A1 | 5/2007 | Ramer et al. | |
| 2007/0150349 A1 | 6/2007 | Handel et al. | |
| 2007/0164902 A1 | 7/2007 | Bang et al. | |
| 2007/0189473 A1 | 8/2007 | Altberg et al. | |
| 2007/0244750 A1 | 10/2007 | Grannan et al. | |
| 2007/0255701 A1 | 11/2007 | Halla et al. | |
| 2007/0260519 A1 | 11/2007 | Sattley et al. | |
| 2008/0028067 A1 | 1/2008 | Berkhin et al. | |
| 2008/0034088 A1 | 2/2008 | Suresh | |
| 2008/0049786 A1 | 2/2008 | Ram et al. | |
| 2008/0091489 A1 | 4/2008 | LaRock et al. | |
| 2008/0103850 A1 | 5/2008 | Shen | |
| 2008/0214157 A1 | 9/2008 | Ramer et al. | |
| 2008/0220760 A1 | 9/2008 | Ullah | |
| 2008/0275748 A1 | 11/2008 | John | |
| 2008/0294760 A1 | 11/2008 | Sampson et al. | |
| 2009/0048911 A1 | 2/2009 | Shenfield et al. | |
| 2009/0052454 A1 | 2/2009 | Pourcher et al. | |
| 2009/0129377 A1 * | 5/2009 | Chamberlain et al. | 370/389 |
| 2009/0138427 A1 | 5/2009 | Kalavade | |
| 2009/0138446 A1 | 5/2009 | Kalavade | |
| 2009/0138447 A1 | 5/2009 | Kalavade | |
| 2009/0138593 A1 | 5/2009 | Kalavade | |
| 2009/0181649 A1 | 7/2009 | Bull et al. | |
| 2009/0210928 A1 | 8/2009 | Ourega | |
| 2009/0216682 A1 | 8/2009 | Foladare et al. | |
| 2009/0247193 A1 | 10/2009 | Kalavade | |
| 2009/0248680 A1 | 10/2009 | Kalavade | |
| 2010/0031274 A1 | 2/2010 | Sim-Tang | |
| 2010/0278068 A1 | 11/2010 | Nobert et al. | |

OTHER PUBLICATIONS

"Arbor e100—Unmatched Scale and Intelligence in a Broadband Service Optimization Platform" Arbor Networks, Inc. 1999-2000, 4 pages.

International Search Report and Written Opinion of the International Searching Authority, the United States Patent and Trademark Office, for International Application No. PCT/US08/85000, dated Jan. 28, 2009, 8 pages.

* cited by examiner

| Application | Location | User Info | Content | Content History | Community |
|---|---|---|---|---|---|
| Web/WAP | ● | ● | | ● | |
| Video/TV | ● | ● | ● | ● | |
| Messaging | ● | ● | ● | ● | ● |
| Search (Voice, Web) | ● | ● | | | |
| Gaming | ● | ● | | ● | ● |
| Social Networking | ● | ● | | ● | ● |
| Voice (CRBT) | ● | ● | | ● | ● |

Figure 9

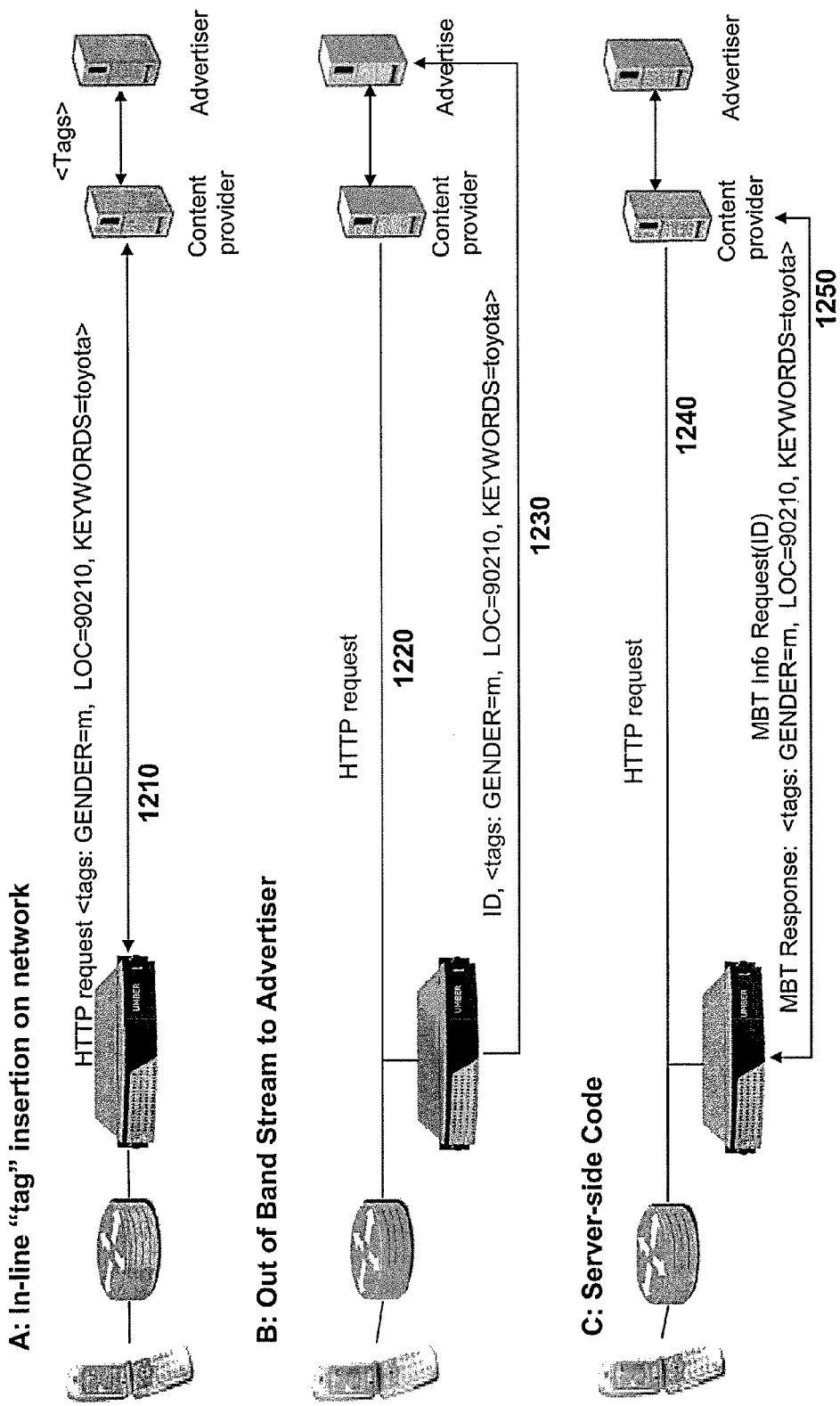
Figure 12 A-C

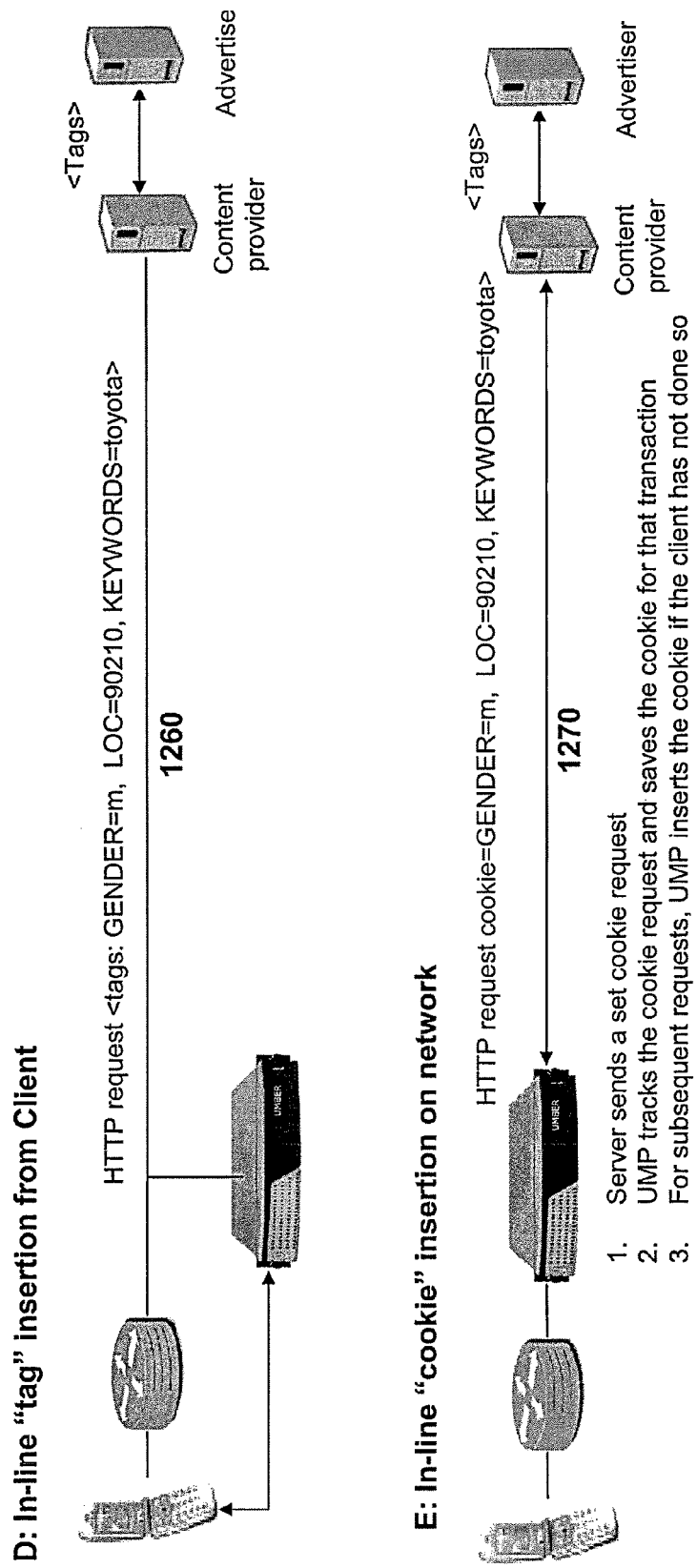
Figure 12 D-E

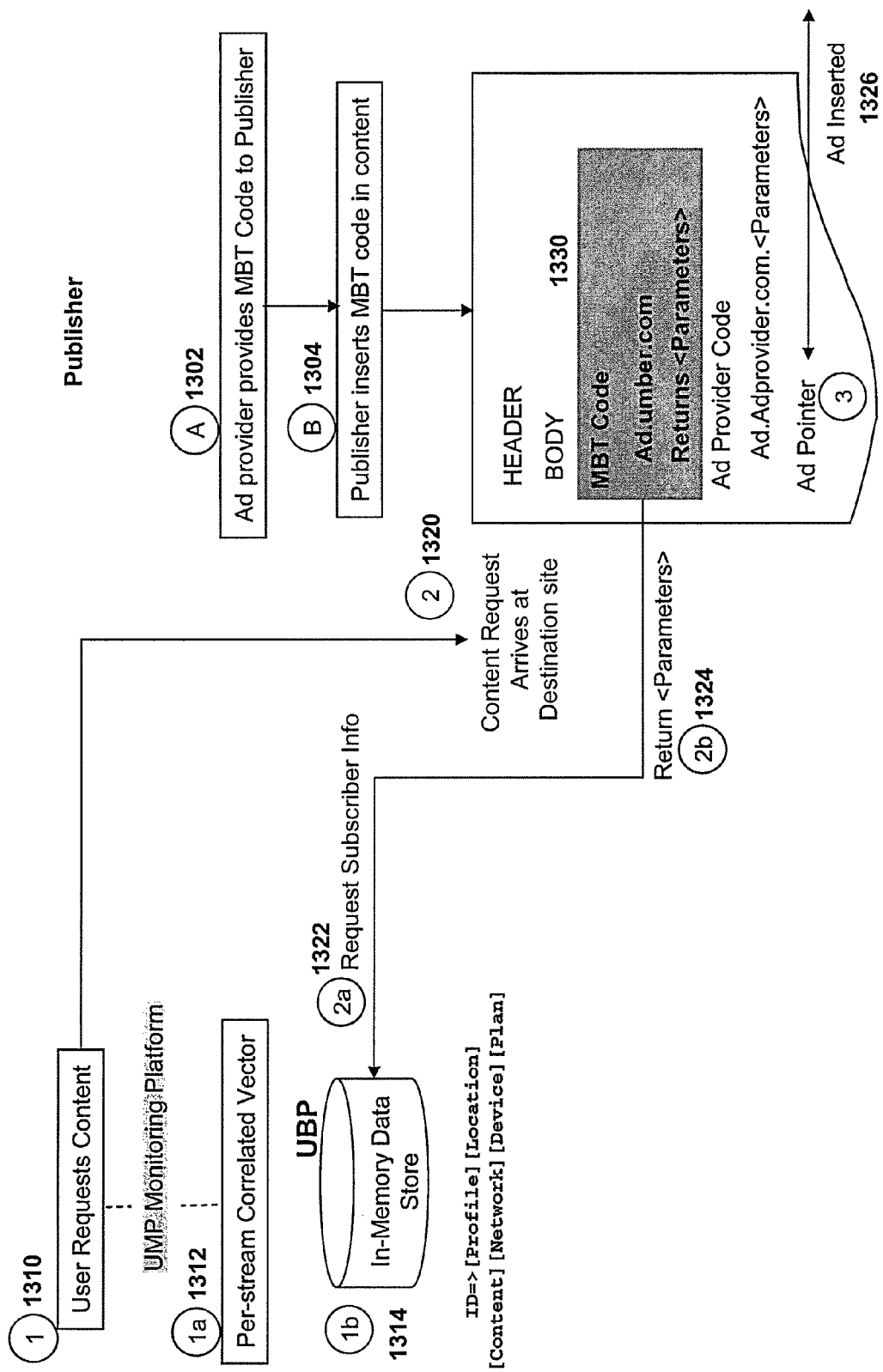
Figure 13 - A

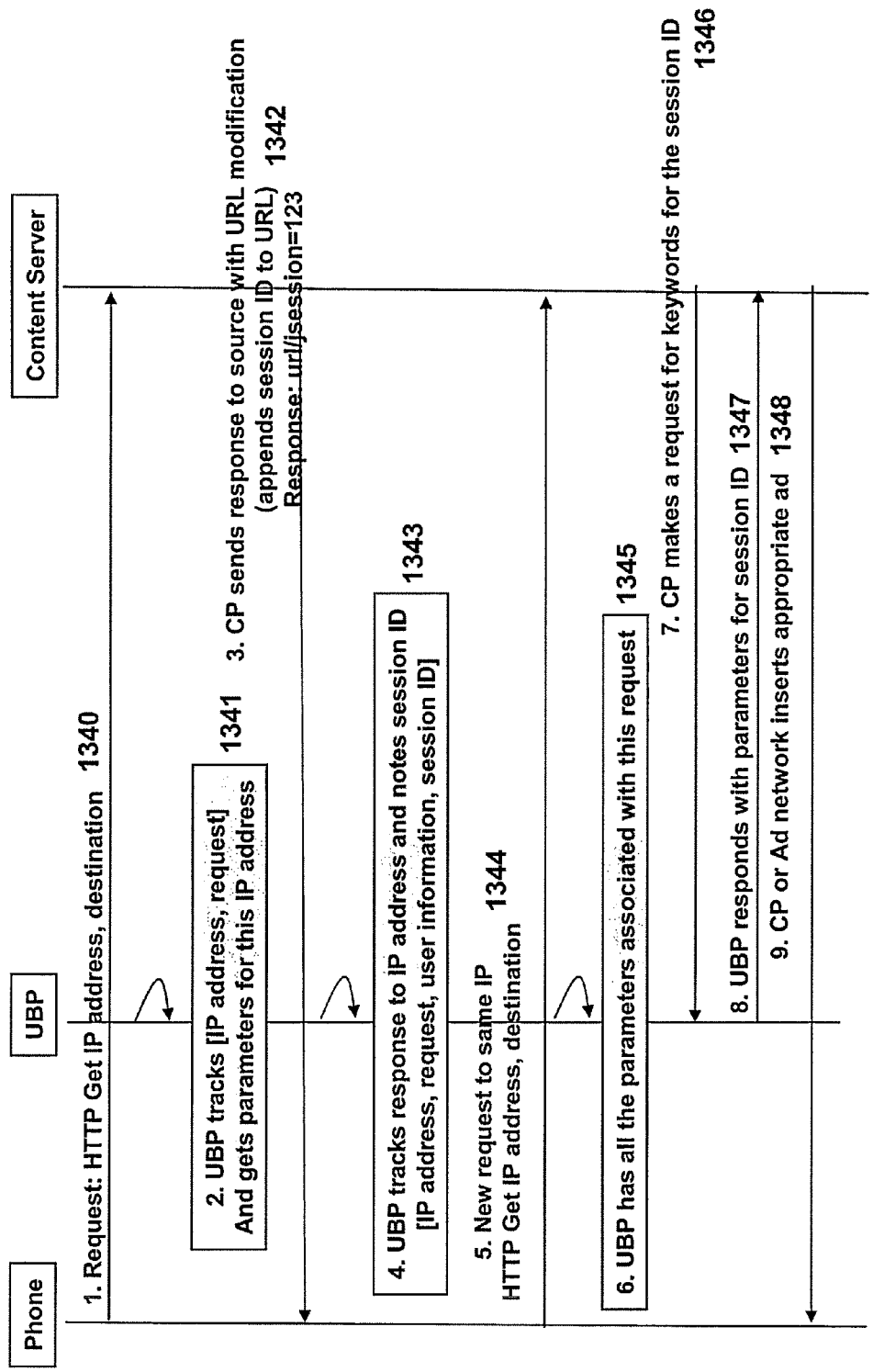
Figure 13-B (Correlation with session IDs)

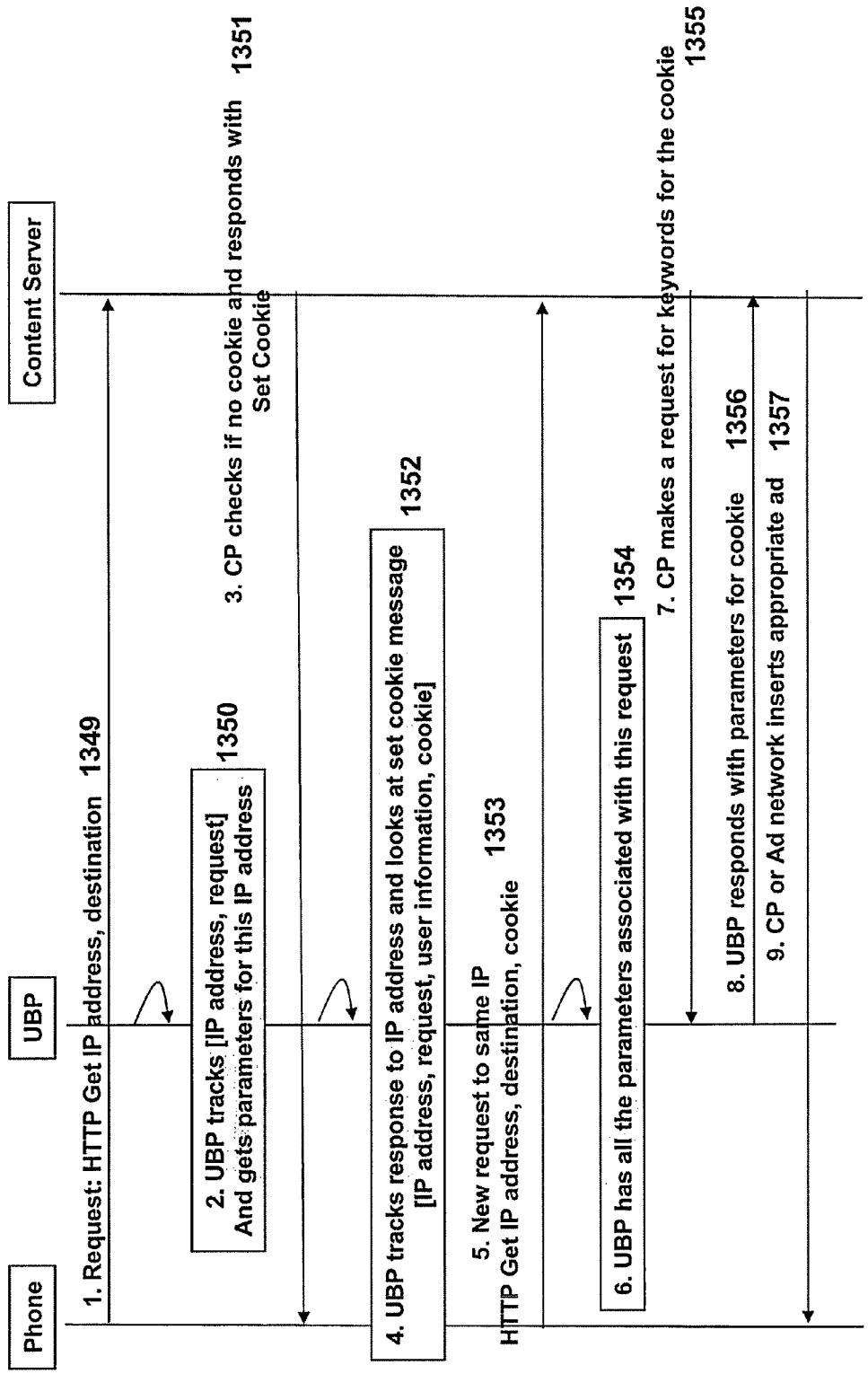
Figure 13-C – Correlation with cookies

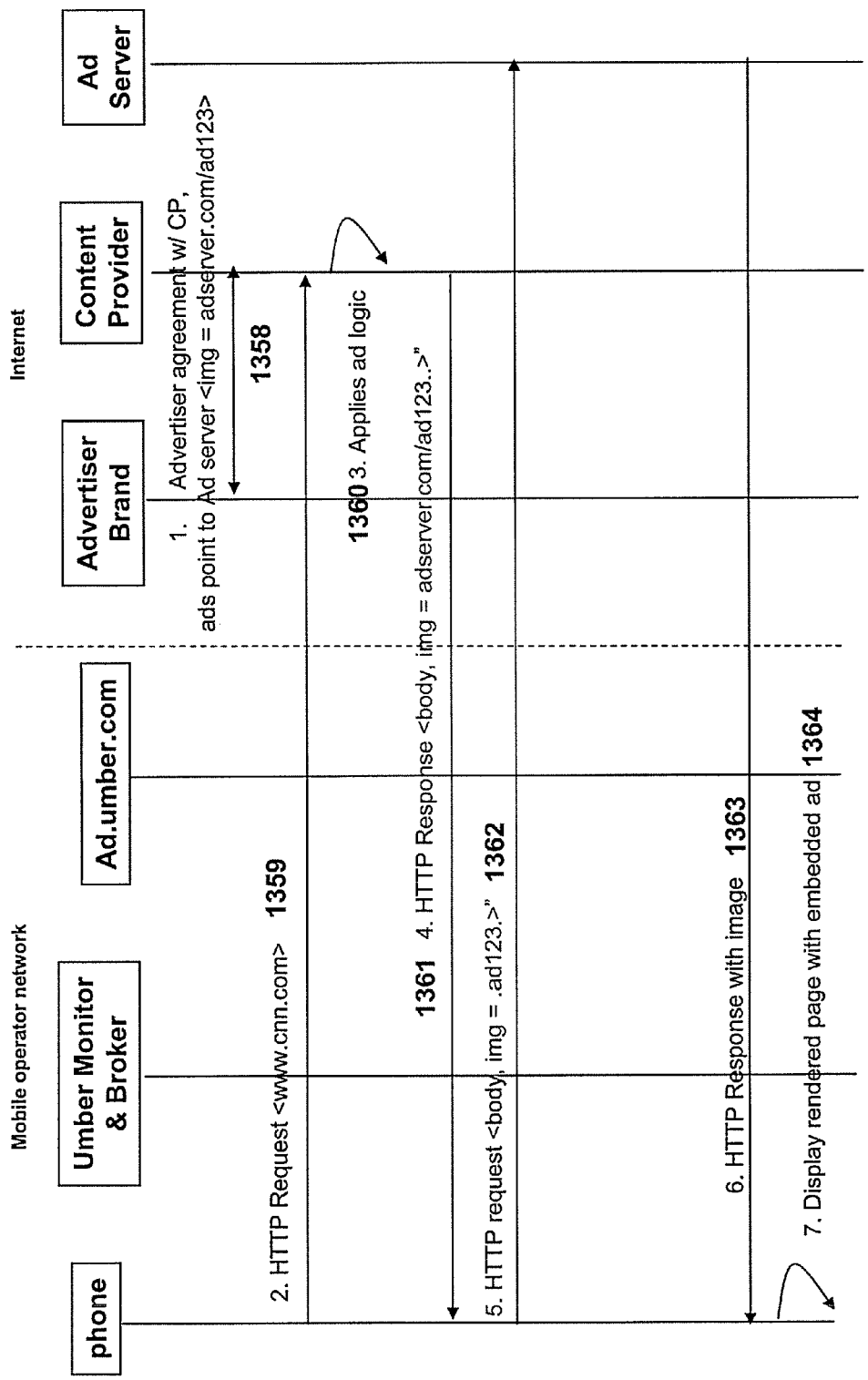
Figure 13-D – Operation before brokering
(Prior Art)

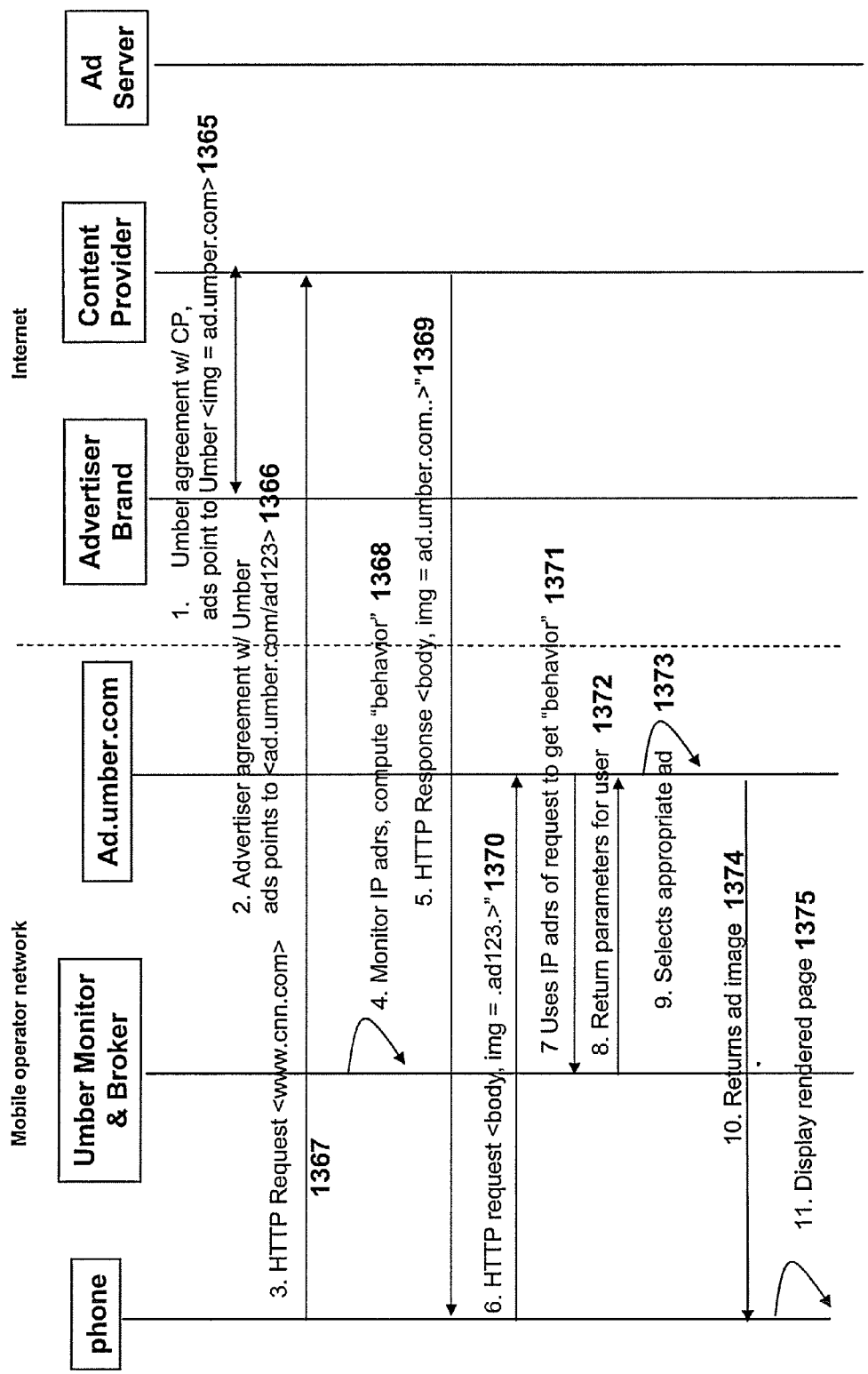
Figure 13-E operation after brokering

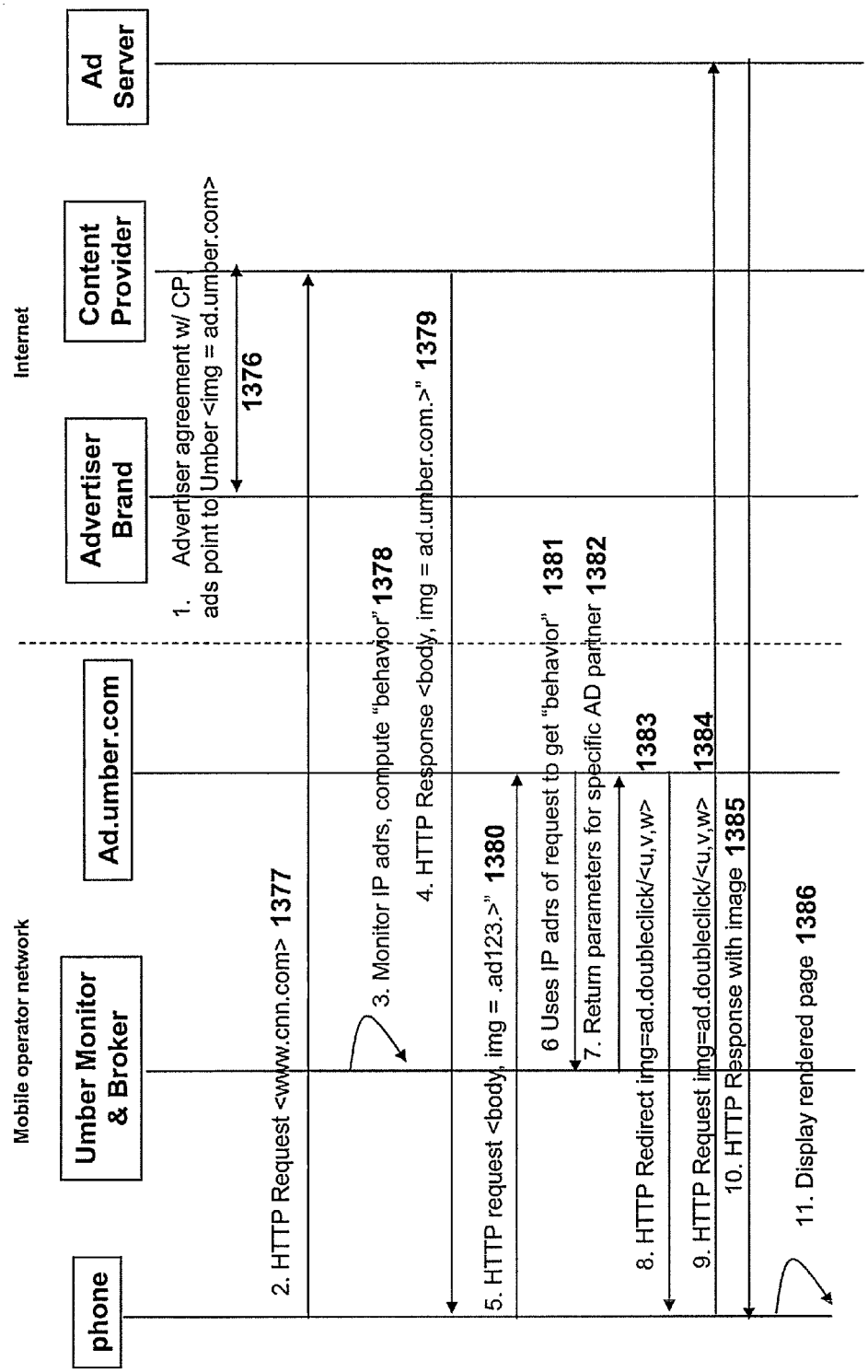
Figure 13-F operation after brokering with ad hosted on server

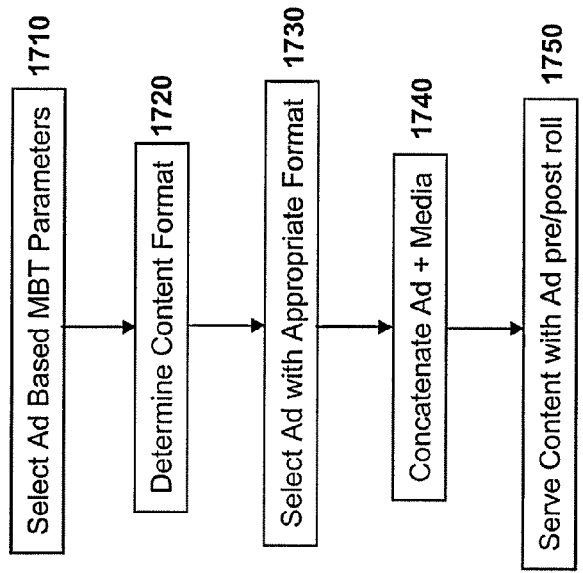
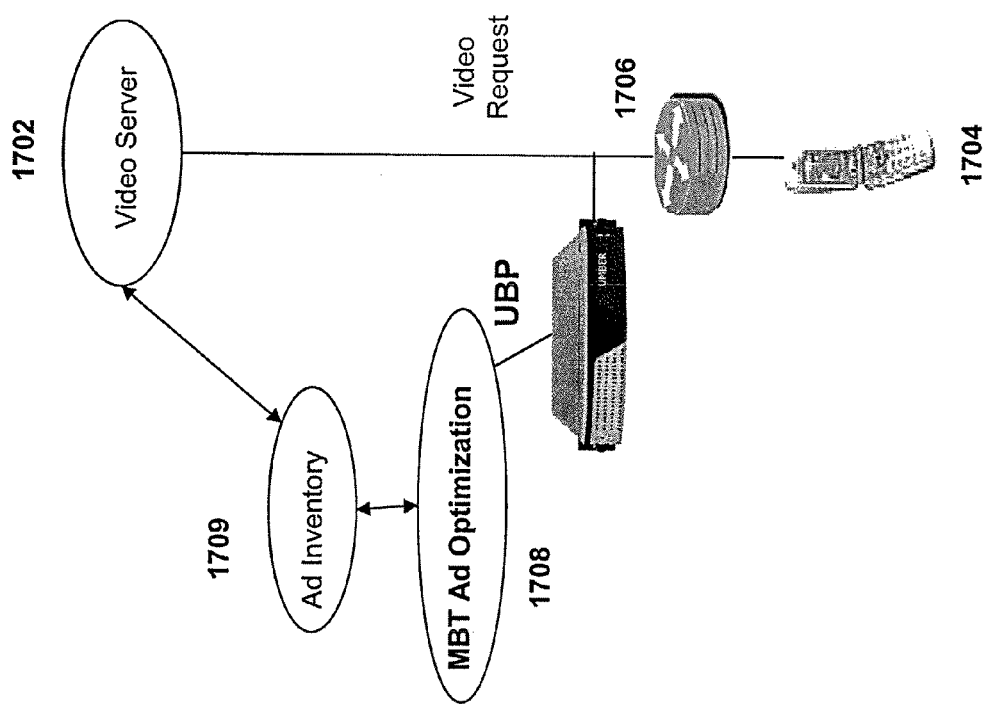
Figure 17

SYSTEM AND METHOD FOR SHARING ANONYMOUS USER PROFILES WITH A THIRD PARTY

CROSS REFERENCE TO RELATED APPLICATIONS

This application claims priority under 35 U.S.C. §119(e) to U.S. Provisional Application Ser. No. 61/039,436, filed on Mar. 26, 2008, entitled "Method and Apparatus for Real-Time Brokering of Mobile Subscriber Information for Personalization of Advertising and Content," the contents of which are incorporated by reference in its entirety.

This application is a continuation-in-part of and claims priority under 35 U.S.C. §120 to the following applications, the entire contents of which are incorporated by reference:

U.S. patent application Ser. No. 12/324,672, entitled "System and Method for Collecting, Reporting, and Analyzing Data on Application-Level Activity and Other User Information on a Mobile Data Network," filed Nov. 26, 2008;

U.S. patent application Ser. No. 12/324,675, entitled "Method and Apparatus for Real-Time Collection of Information about Application Level Activity and Other User Information on a Mobile Data Network," filed Nov. 26, 2008;

U.S. patent application Ser. No. 12/324,671, entitled "Method and Apparatus for Storing Data on Application-Level Activity and Other User Information to Enable Real-Time Multi-Dimensional Reporting about User of a Mobile Data Network," filed Nov. 26, 2008; and U.S. patent application Ser. No. 12/324,611, entitled "Method and Apparatus for Real-Time Multi-Dimensional Reporting and Analyzing of Data on Application Level Activity and Other User Information on a Mobile Data Network," filed Nov. 26, 2008.

This application is related to U.S. patent application Ser. No. 12/412,276, entitled "A System and Method for Creating Anonymous User Profiles from a Mobile Data Network," filed on even date herewith.

BACKGROUND OF THE INVENTION

The present invention relates generally to mobile advertising and more specifically to personalized behavioral targeting of mobile advertisements.

1. Technical Field

The present invention relates generally to mobile advertising and more specifically to personalized behavioral targeting of mobile advertisements.

2. Description of the Related Art

Mobile data usage is increasing, due to the availability of higher speed networks, more capable and advanced devices, and increasing trend towards operators offering flat-rate data plans. As a result, there is a growing momentum towards using rich media content on mobile devices. This opens up a huge possibility of advertising and personalization around this mobile content. What makes mobile advertising even more attractive than other digital advertising on the Internet is that phones are highly personal and mobile devices. In other words, a phone is associated with a specific individual (unlike a "family" PC) and travels with the user (unlike the home or work PC being used in specific environments). As a result, there is a huge potential to target advertisements to a specific user through personalization based on demographics, usage patterns, and location. As the user moves to different places, the advertisements can be tailored to the location to deliver ads that are very relevant to the location. In addition, the ads can also be targeted to match the user's behavior, based on history as well characteristics of the user's device and network. For instance, it is possible to serve ads based on past history of transactions or interests. Further, since a mobile user often uses several applications, ads can be targeted across applications such as SMS, Web browsing, Video, Voice, Search, etc. Also since the mobile is a 'communication' device, it is possible to infer communication networks around a user to insert appropriate ads across a community of users. Other dimensions include the user's tariff plan—for instance, post paid users with unlimited data plans are attractive for different types of advertisements than a prepaid user. This concept of personalization based on user-level mobile information is referred to as "Mobile Behavioral Targeting".

The state of Mobile Advertising today does not allow such personalization since mobile information cannot be effectively leveraged. The data required for such personalization exists in silos in the mobile network. There is a lack of techniques to correlate the data across different dimensions. Further, there is also no known methodology for analyzing this information to determine the best parameters to be fed to get the best targeting and for inserting this information, in real-time, into existing applications. In addition, privacy issues need to be adhered to. The preferred embodiment of the invention describes a method to enable such mobile behavioral targeting, while maintaining privacy.

Prior art can be grouped into two categories: (a) internet-style behavioral targeting (b) mobile ad networks and campaign management platforms.

Behavioral targeting has been explored for on-line PC users, but those techniques don't apply in the context of mobile targeted ads because new techniques are required to capture the information required for behavioral targeting in the mobile world. The preferred embodiment of the invention describes methods to capture relevant mobile specific data and to correlate it to generate targeting data.

The mobile advertising platforms today are in their early stage where the focus is on creation of campaigns and not on targeting. As these evolve into targeting, they need new methods to insert ads into the mobile applications, Existing methods used on the internet don't apply. The preferred embodiment of the invention describes methods to insert this targeting information into different mobile applications for targeting.

These two aspects of the challenges in the prior art are described in detail next.

Challenges with extending internet-style targeting for mobile: Many of the standard PC approaches used on the Internet today (e.g. Tacoda, Revenue Science, AlmondNet) track user behavior on the network through cookies, action tags, and clickstream information for a set of participating publishers. They collect information obtained from cookies and action tags from participating publishers and perform click stream analysis to get information about users. These profiles are then used for targeting, typically by passing data through cookies. Such a cookie based tracking and targeting approach doesn't work on mobile networks. Cookies can't be generalized across all mobile devices. Many of the non-smartphone devices don't support cookies. Further, cookies on mobile devices are often deleted or stripped by gateways. Also, the information used by these internet targeting approaches is restricted to usage history for the set of sites they track. Not only are they limited because of the set of sites, but they also don't layer in other pieces of information such as location or demographics because this data is not usually accurately available for the Internet. Demographics information accuracy depends on their heuristics or subscriber disclosure—which may not be very accurate. Some point services (e.g. Quova Geopoint, Digital Envoy Geo-Intelligence, or Digital Island TraceWare) map IP addresses to location, but these techniques don't work on mobiles since often times mobile networks mask IP addresses and user locations keep changing, so static IP addresses are not relevant.

There are other recent players that are addressing behavioral targeting on the Internet through network based solutions—e.g. FrontPorch, NebuAd, Project Realto, etc. These approaches work with ISPs to monitor all user traffic and then correlate accesses to generate user behavioral profiles. While these approaches eliminate cookies, these approaches are restricted to the usage dimension and don't consider other parameters such as location. Also, these tend to be limited to Web applications, and don't extend well across mobile applications.

Thus, in general terrestrial internet approaches don't work on the mobile since techniques used in the PC world for getting further information through client side scripts and cookies etc. are not universal on mobile phones. Further, mobile approaches can take advantage of other information that is unique to mobiles, such as location and precise demographic data. Since this information is not available on the PC, the internet specific approaches don't use this data.

Challenges with existing mobile advertising platforms and why they don't do mobile behavioral targeting: Existing mobile ad platforms (e.g. ThirdScreen Media (AOL), AdMob, Rhythm New Media, Millennial Media, DoubleClick, Amobee, etc.) are focused on a methodology to create ad campaigns and deliver basic ads. These ads are usually either contextual or based on some basic data. For instance, a contextual ad relies on the context of the page that is being viewed—it is not targeted to the specific user. In some cases, a carrier may provide some basic data such as demographics to a subset of sites. In this case, the ad can be targeted based on this limited data. However, to achieve the full potential of targeting such a white-list approach is not sufficient. For one, only limited data is available this way. Second, this approach also suffers from privacy problems. In order to accomplish behavioral targeting, ad networks need rich multi-dimensional targeting info. This data is within the mobile network and requires technologies to collect, mine, correlate, and broker this data securely. The preferred embodiment of the invention describes a method to provide additional information (e.g. location, demographics, usage history, etc.) to the ad selection process so that ads can be better targeted to the user. The preferred embodiment of the invention leverages the data collection techniques described in U.S. application Ser. No. 12/324,671, U.S. application Ser. No. 12/324,672, and U.S. application Ser. No. 12/324,675.

SUMMARY

The invention provides a system and method for sharing anonymous user profiles with a third party. In one aspect of the invention, a system shares user profiles with content servers on a mobile data network so that they may select content responsive to the user profile. The system provides a store of user profiles for associating profile information with either a source IP address or mobile phone number, where the profile includes information on the user and the user's network usage. The system then detects a user's request for a transaction with a content provider and inspects the request for either an IP address or phone number, which it uses to retrieve the appropriate profile. The system subsequently applies predetermined opt-out policies to determine how much of the user profile may be provided in response to the profile request. The system then returns the profile information such that the user's identity is masked.

In another aspect of the invention, an advertisement server uses the user profile to select advertising content to provide to the user's mobile device.

In another aspect of the invention, the source IP address and destination address for a transaction are detected and associated with a user session. The session ID is detected in response to the transaction request, and the content provider makes a profile request using the session ID to identify the requested profile information.

In another aspect of the invention, the source IP address and destination address for a transaction are detected and the content server replies to a user request with a cookie message. The cookie is detected and associated with the user profile, and the content provider makes subsequent profile requests using the cookie to identify the requested profile information.

BRIEF DESCRIPTION OF THE DRAWINGS

For a more complete understanding of the present invention and the advantages thereof, reference is now made to the following descriptions taken in conjunction with the accompanying drawings, in which:

FIG. 9 illustrates the targeting logic used to determine the targeting information

FIG. 12 A-E shows the how subscriber behavioral information is inserted in Web traffic FIG. 13A illustrates an approach for Mobile Behavioral Targeting for Web/WAP applications, in conjunction with an external ad network;

FIG. 13B shows the specifics for how the information is passed back where sessions are tagged by session ID;

FIG. 13C shows the specifics for how the information is passed back where sessions are tagged by cookies;

FIG. 13D shows the operation of an Ad system without UBP;

FIG. 13E shows Web targeting with UBP hosting Ads;

FIG. 13F shows Web targeting with external Ad server hosting Ads;

FIG. 17 illustrates an approach for Mobile Behavioral Targeting for Video applications;

DETAILED DESCRIPTION OF AN ILLUSTRATIVE EMBODIMENT

Figure 1:
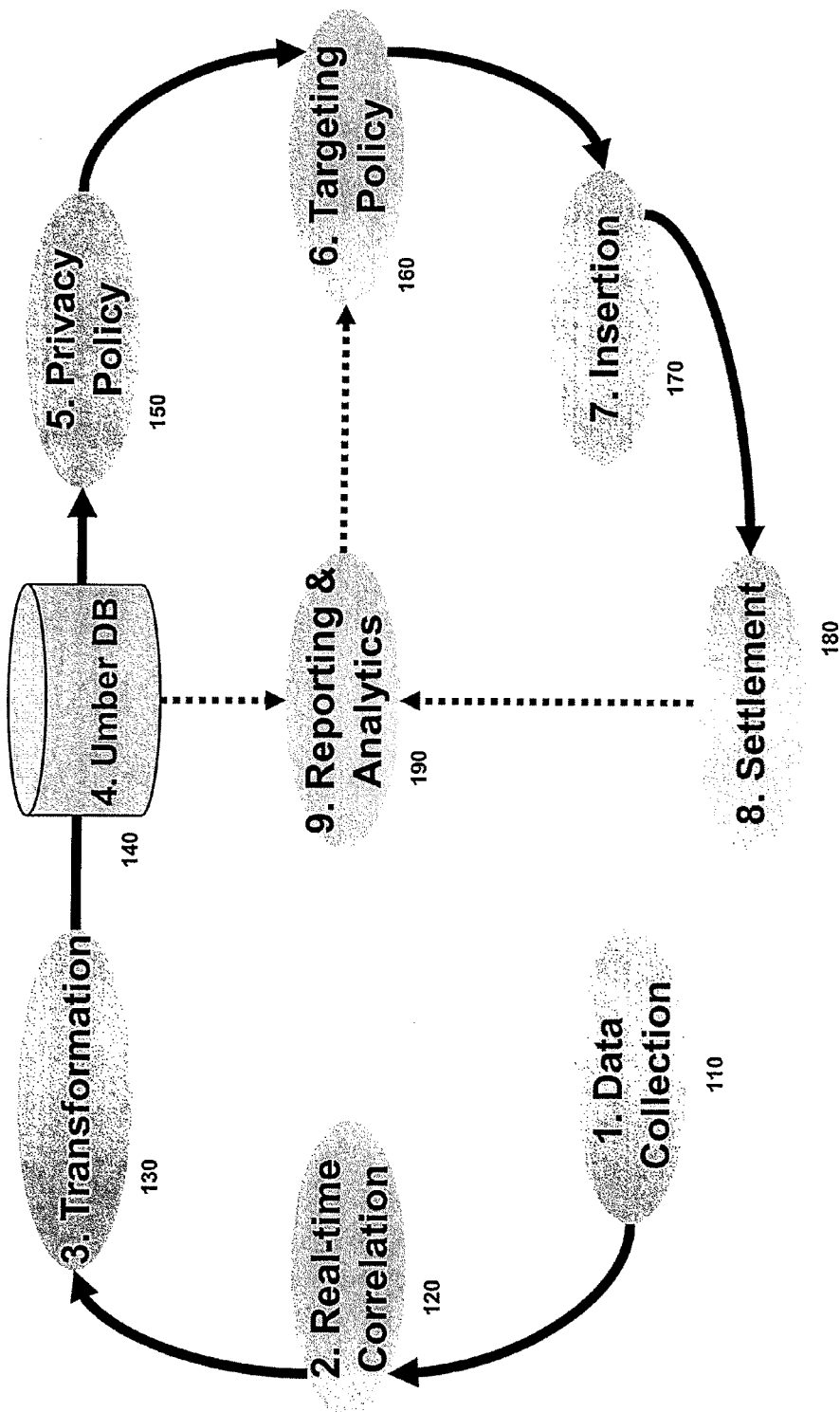
FIG. 1 shows the operational flow in the UBP platform.

Preferred embodiments of the invention provide a brokering platform that non-intrusively provides targeting information to mobile applications and advertising platforms. The brokering platform collects data from a mobile network, correlates to generate enriched user-level profiles, and uses these profiles to provide targeting information to different applications and advertising platforms.

The preferred embodiment of the invention describes an approach to get access to this unique mobile-specific information and to use it to effectively achieve mobile behavioral targeting within an existing ecosystem of handsets, mobile infrastructure, and content servers as well as within existing business processes applied in the mobile operator and content provider worlds. Among other things, the design allows the brokering platform to be used for:

1. Enabling a mobile operator to securely exchange brokering data with third party application and content providers and advertisers without compromising user privacy;
2. Brokering targeting information for enhancing the effectiveness of mobile ads through targeting. Ads can be targeted into multiple apps such as web, video, messaging, and gaming without changing the applications or processes used in the ad servers;
3. Operating a carrier-specific ad exchange that takes into account mobile-operator specific capabilities and data;
4. Using mobile targeting information to target ads on PCs;
5. Using targeting information to personalize user content and user experience. For instance, on-device portals can be tailored to users without their having to customize it periodically. Content providers can provide content unique to user's locations, etc. This user segmentation can also be used to better target existing applications and services to mobile users.

Overall Flow for Mobile Behavioral Targeting:

The steps for such targeting are described next and described in FIG. 1:

1. Capture (110): The mobile subscriber data across applications and dimensions is captured. This capture is continuously happening in real-time. As time progresses, further information is available and the data contains additional information and this can be used to generate historic information. Data collection techniques for the preferred embodiment of the invention are described in U.S. application Ser. No. 12/324,671, U.S. application Ser. No. 12/324,672, and U.S. application Ser. No. 12/324,675;
2. Correlation (120): The information collected from different data fields is correlated to create a rich subscriber profile as well as historic information for usage;
3. Transformation (130): The collected data is transformed into an internal vector with masked user identities and saved based on opt-out policies;
4. Storage (140): The data is then stored in an internal database;
5. Privacy (150): When a request for serving targeting information comes along, the privacy policies are checked to enforce opt-out policies;
6. Targeting (160): The science and logic for determining the best targeting parameters, including cross-application targeting and segmentation is applied. This allows the user information to be used effectively for targeting, depending on the user, policies, application, etc. The targeting information can be used in several ways. First, it can be used in real-time to target a specific ad. Second, it can be used to generate a list of users for campaign management. Third, it can also be used to target the user experience in real-time by recommending new related applications or content;
7. Insertion (170): The next step is to insert the selected information seamlessly, in real-time, within applications;
8. Audit and Settlement (180): As ads are being targeting, the system provides a method to audit the information passed in order to enable settlement with the advertisers or content providers; and
9. Reporting (190): The platform continues to provide real-time and audit reports on the application level behavior as well as information shared. These reports can also be used by operators to improve their network policies, analyze applications, etc. For instance by identifying that a specific application is used more, it can be given higher priority for advertising. The app can also be moved to an on-deck portal for better access.

Platform Architecture

Figure 2:
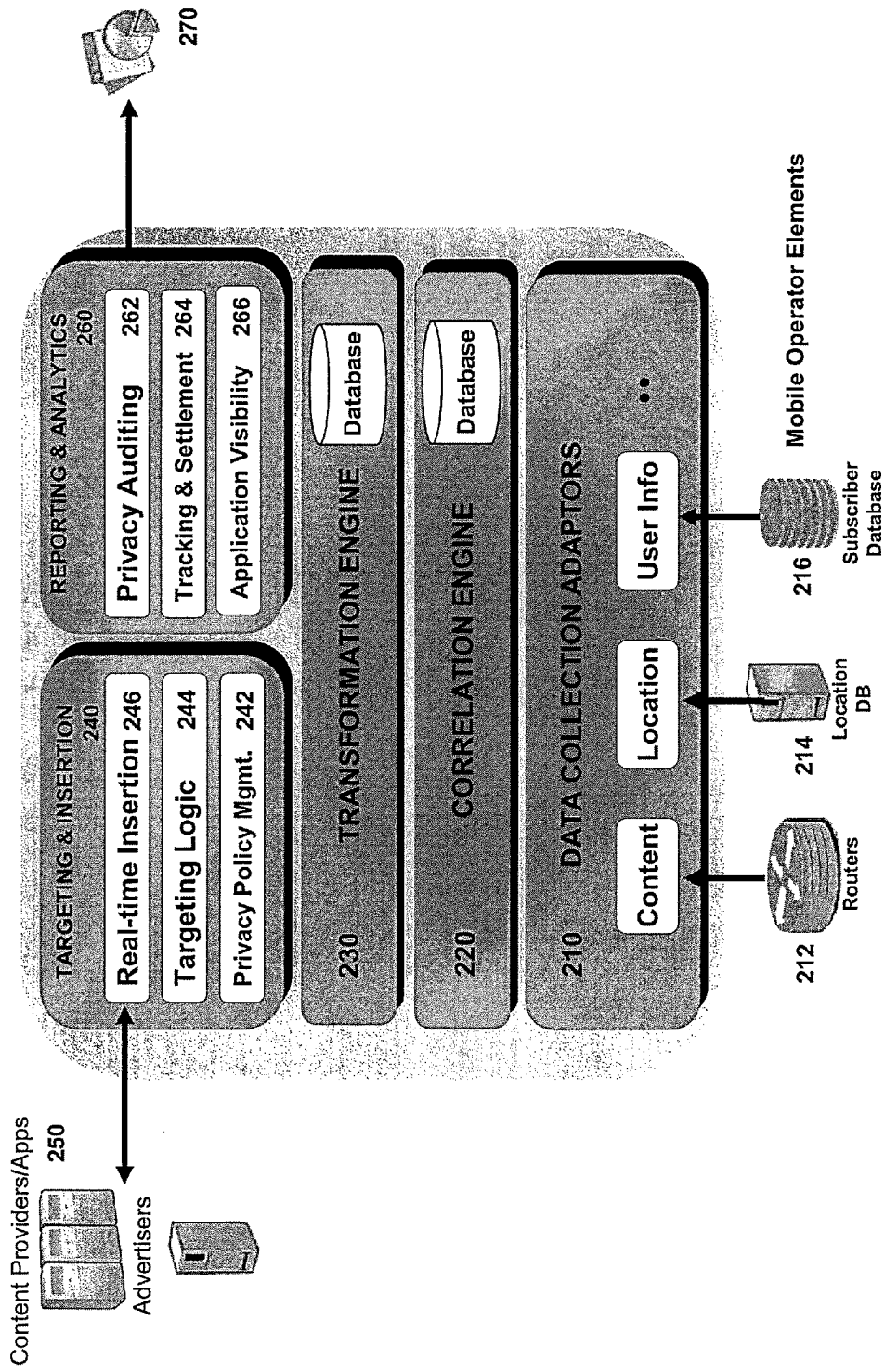
FIG. 2 shows the Platform Architecture for the UBP Platform

FIG. 2 shows the brokering platform architecture. The platform comprises several modules:

1. Data collection: This module 210 comprises different adaptors to collect information from the mobile network. New adaptors and data collection approaches can be easily added into the platform. Example adapters include real-time Web/WAP stream monitoring (output of GGSN, HA, etc.), location data connectors, subscriber databases (e.g. LDAP), SMS/MMS traffic, USSD traffic, voice CDRs, WAP logs, or logs from specific applications and Value Added Service Platforms (e.g. ringtones, wallpapers, etc.). Another type of adapter is one that collects data from clients on phones, e.g. a shim or a brokering client on the handset;
2. Correlation Engine: This module 220 takes the data from different adaptors and generates a single correlated vector that is stored into the database. Different data modules are often identified through different IDs, including mobile phone number, user ID, IP address, etc. The correlator maps these identities and generates a vector with user information. The data is also stored such that user-specific information can be masked;
3. Targeting and Insertion: This module 230 determines and applies the targeting logic and privacy policies for advertising. It also includes adaptors to pass the anonymous vector to other applications. This is also a scalable design in that new applications and forms of information exchange can be easily added into the system. Specific insertion mechanisms are described in the later part of this document; and 4. Reporting and Analytics: This module 240 generates reports to audit information exchanged, performance, etc. It also includes application level monitoring information so that the operators and advertisers can target appropriately. The module also includes a rich policy language so that advanced specific queries can be generated on the logic. The Application Targeting logic allows real-time analytics on the data for dynamic segmentation of users.

In one implementation scenario, the monitoring and data collection function can be separated out from the data analytics and exchange functions. In this case we refer to the monitoring function as the UMP and the brokering and related functions as UBP. In some cases all the functions could be implemented on the same platform.

Deployment

Figure 3:
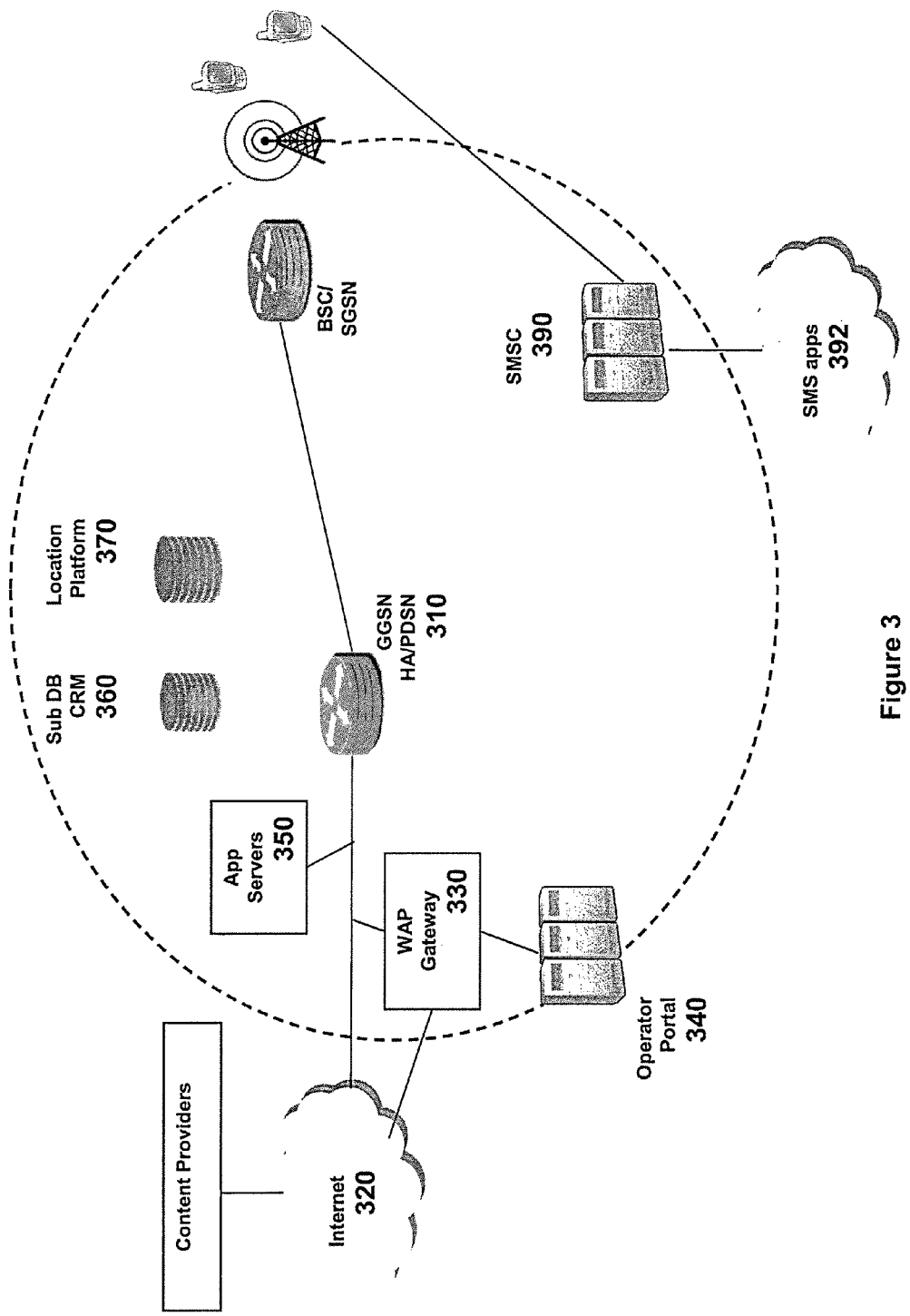
FIG. 3 shows the general mobile network architecture

The general context of a mobile network is shown in FIG. 3. A generic architecture is shown, which could map to either GSM or CDMA technologies. Mobile devices connect through the base stations and the mobile data core through a router such as a Gateway GPRS Serving Node (GGSN), Packet Data Serving Node (PDSN), Home Agent (HA) GGSN/PDSN/HA 310. The GGSN is in a GSM network. In a CDMA network, the devices connect through a PDSN/HA. In case the network is based on simple IP, there may not be a HA but just a PDSN. The mobile data request may be sent to content and application servers outside the mobile network 320 (this is often referred to in the industry as off deck' or 'off net') or to an operator portal 340 via a WAP gateway 330. The data request may also be to application servers 350 which may be internal or external to the operator. The data at the output of the GGSN 310 thus comprises all types of data applications, including Web, WAP, video, audio, messaging, downloads, and other traffic. In addition, the mobile data network has a subscriber database 360 that manages subscriber information. This could also be a Customer Relationship Management (CRM) database or an Authentication, Authorization, and Accounting (AAA) server. The network also consists of a location platform 370. Other types of data sources could be Short Messaging Service Center (SMSC) 380 that manages messaging traffic. The Billing System 390 manages the billing information for user services.

Figure 4:
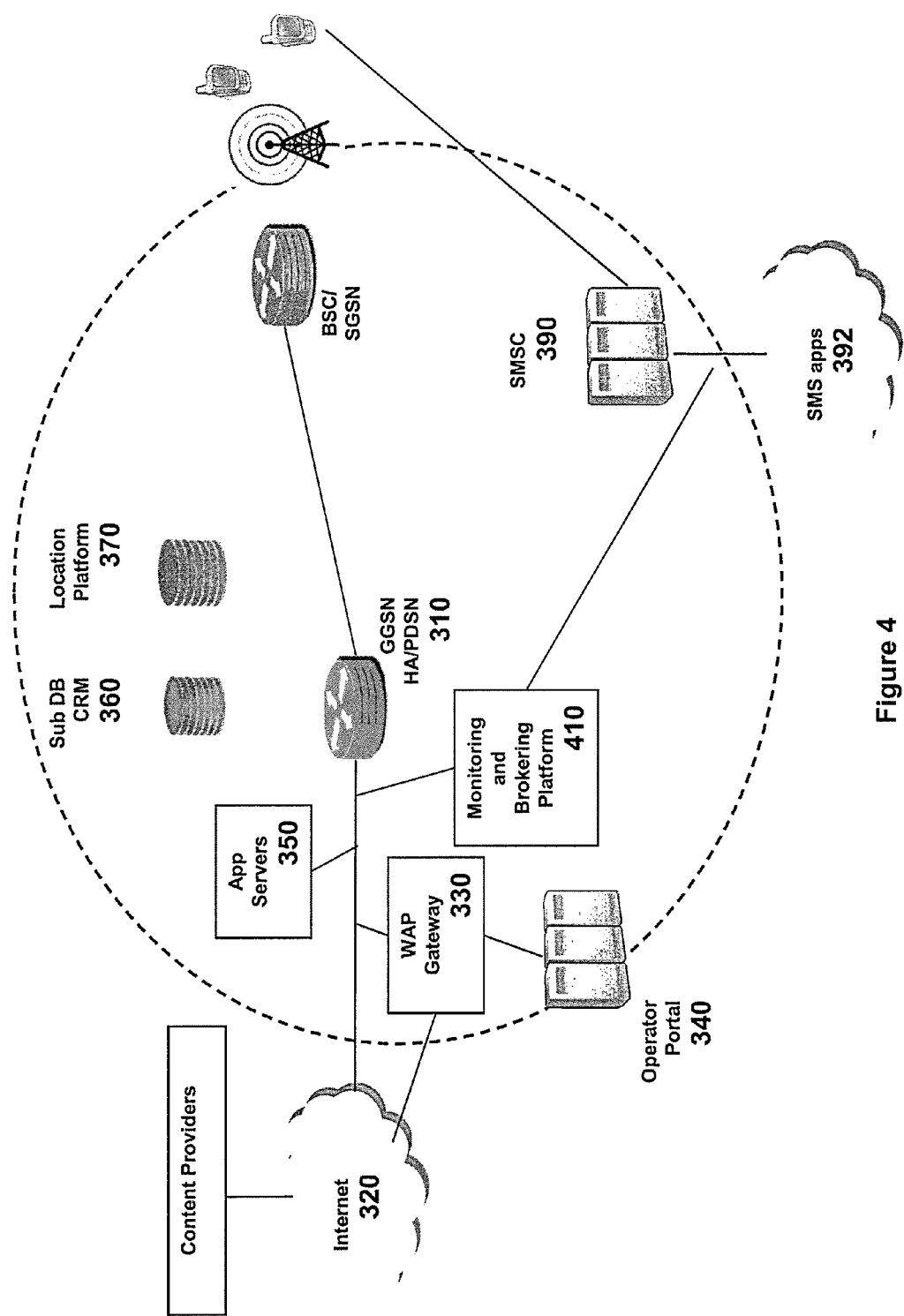
FIG. 4 shows the deployment of the brokering platform within the context of a mobile network

FIG. 4 shows the conceptual deployment of the brokering platform 410 within the mobile operator network. It is deployed in a non-intrusive non-inline architecture that collects data off the routers or messaging gateways.

Capture

Figure 5:
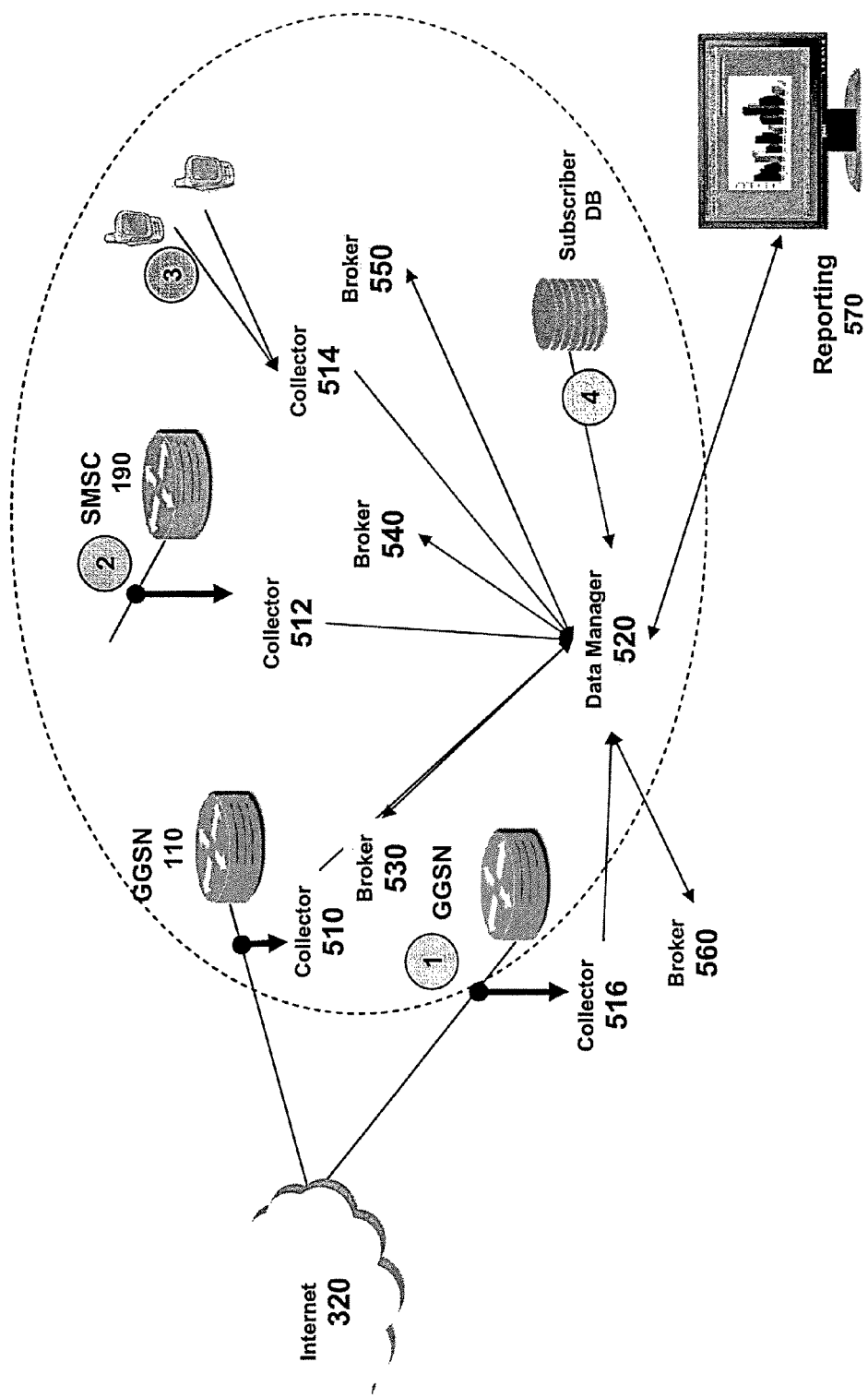
FIG. 5 shows the details of the deployment of the brokers and monitors comprising the brokering platform

FIG. 5 shows how the information itself is collected by the brokering platform. The brokering platform sits in the mobile network and through adapters (called Collectors 510, 512, 514, 516) collects information from multiple sources—content level information from the GGSN/PDSN/HA 310 output, location information from LBS platforms, subscriber information from subscriber databases, Messaging traffic from SMSC/MMSC, USSD, etc. Some feeds are tagged with IP address (e.g. GGSN output) while some feeds have a phone number (LBS). The Collector determines a mapping of IP address and phone number and sends a correlated vector to the Data Manager 520. The Data Manager gets the correlated information for a specific stream. It also maintains a historic database which keeps track of past transactions at a high level. Other feeds such as social networking contacts, CDRs for voice call records, SMSC feeds, etc. are also possible. In addition, logs from applications such as ring tone downloads can also be used. This information is aggregated within the brokering platform to store a rich database for user information. The brokering platform includes the collectors and brokers 520, 530, 540, 550 placed in conjunction with each Collector. The brokers manage the process of getting transaction information, retrieving targeting data, and sending the targeting info to the appropriate application. In an alternative architecture, the brokering platform can also sit outside the mobile network and collect information through distributed agents on mobile devices. A hybrid approach that combines both client and network based collection is also possible.

Operational Flow of the Brokering Platform

Figure 6:
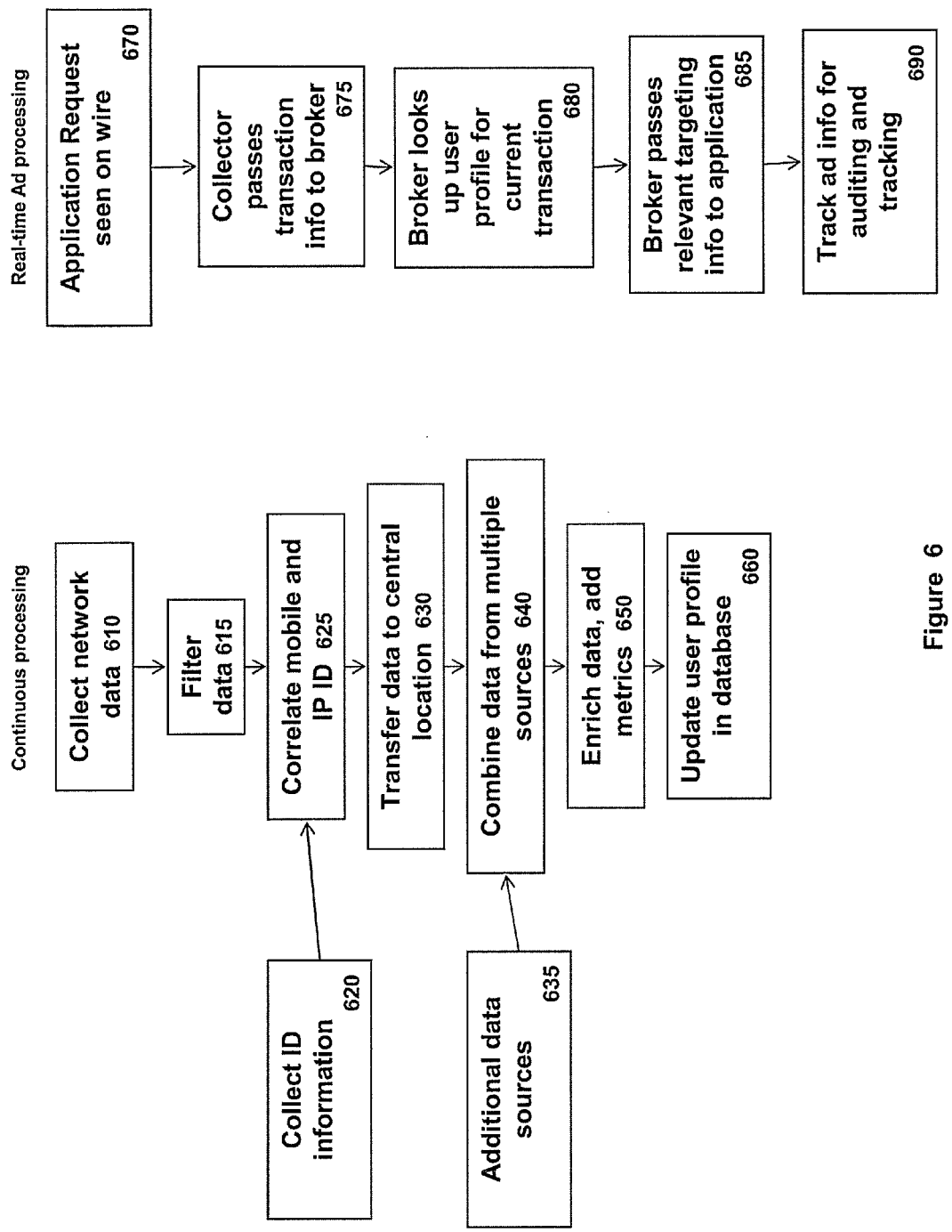
FIG. 6 shows the operational flow of the brokering platform

FIG. 6 shows the operational flow of the brokering platform. There are two aspects to the operation of the brokering platform. The first process runs continuously and builds user profiles within the Data Manager. The second process retrieves a run-time transaction ID when a request for real-time targeting information arrives, retrieves details on the transaction and passes appropriate information to enable targeting ads or applications. These steps are described in more detail below:

1. The collector captures network data for different applications in step 610;
2. The data off the wire is filtered in step 615;
3. The collector also captures phone numbers and correlates them to IP addresses in step 625;
4. At this point other user information associated with the phone number, such as demographic profiles and location data is also collected in step 620;
5. The correlated information is transferred to a centralized data manager in step 630;
6. The centralized data manager also receives data from other sources in step 640;
7. The data is then enriched with other metrics in step 650. At the end of step 7, the enriched event for that user for that transaction is obtained; and
8. The user transaction is then used to update the user profile in the database in step 660.

Steps 1-8 above run continuously and update the user profile. The user profile contains information including sites visited, locations visited, usage, etc. It also includes demographic information. This information can be mapped into specific segments that can be further defined based on these parameters. An example of a user profile is <phone number/masked ID><device><demo group><types of destinations visited><types of locations visited><usage pattern>

- The phone number of masked ID is used to identify the user. For privacy reasons, a masked or hashed ID may be used to store user data;
- The device information describes the type of device—smartphone, PC, featurephone etc., OS type, and capabilities, such as touch screen/keyboard support. This is usually not updated regularly;
- The demographic group specifies attributes such as age, gender, service plan type, etc.;
- Types of destinations visited. This includes a list of last few destinations, along with typical patterns such as sports categories, entertainment, etc. This is typically stored as the top few categories and their frequency of visits;
- List of locations visited is used to identify mobility patterns, e.g. user moving within local area, cross country, etc.;
- Other pieces of information could also be added to the profile, as described in step 6. Examples of this could be billing data or spending data, by integration with billing systems. Other possible data sources include data from clients on handsets. For instance, a client on the phone could describe the activity off the mobile network, such as on Wi-Fi networks. Other information can also be inferred, such as usage patterns (heavy/medium/light, day or weekend use, more in morning vs. afternoon, etc.).

Several fields are relatively static e.g. device type, while some fields could change quite frequently. For instance, the locations visited or the categories of destinations visited evolve over time. The types of destinations can be segmented more granularly over time as well. For instance, in a first cut, destinations may be categorized as finance and entertainment. In a next phase, destinations may be finance→equities and entertainment→movies. This allows more specific data to be compiled on user behaviors. This concept of continuously building profiles makes it possible to transparently build more accurate profiles over time.

Although the phone number and IP address are used to build this profile, the phone number itself is not stored into the system. In effect, a masked ID (such as a one-way hash) can be used to build the profile. As a result, no user-identifiable data is stored into the system.

While the entire profile contains a number of characteristics of user behavior, not all parts of the profile may be shared with the upstream advertisers or publishers. For instance, if a carrier has a 'premium' deal with a publisher, they may share all the data. In some cases, a carrier may only share location or usage history data.

1. These data points are used to build a user profile. At the time of brokering, the profile data is extracted, along with current info such as location to build a profile that is exchanged upstream. The exact amount and type of information exchanged, along with the format is flexible and depends on the advertiser receiving this information. When a user requests a transaction (e.g. accesses a web site or video application), the application request is seen on the wire by the collector, in step 670.

2. The collector passes the IP address and corresponding request to the broker in step 675

3. The broker then looks up the user profile for that user from the data manager in step 680. The format of the profile is flexible. In one embodiment the profile could be a vector with details such as demographic segment, location, type of user, etc.

4. The broker passes the profile information to the application in step 685. Details on how this information can be passed to different applications are provided later in this section.

5. The delivery of the ad is recorded for future tracking and reporting in step 690.

Data Dimensions and Correlation

Figure 7:
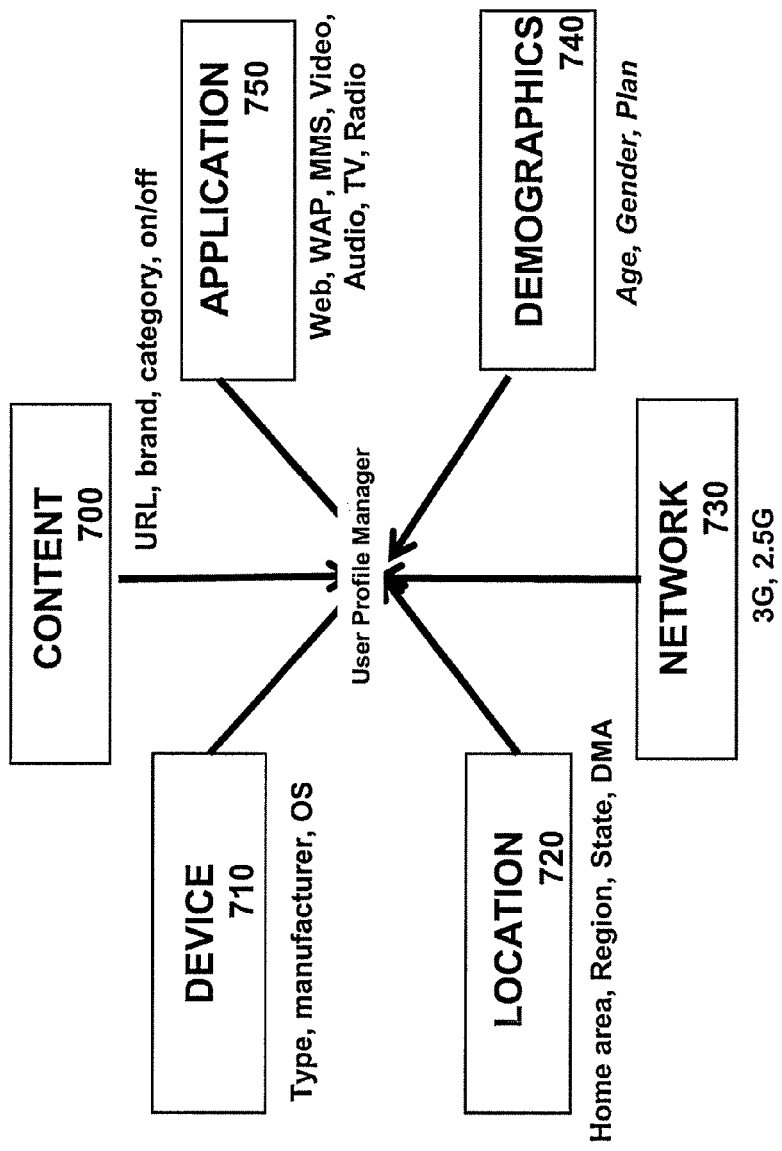
FIG. 7 shows the different dimensions of user information collected for Mobile Behavioral Targeting.

FIG. 7 shows the different dimensions of information captured for generating targeting information:

1. Context 700: This is the request for a specific data. It could be a HTTP or WAP request for web traffic, RTSP requests for media, SMSC feeds for messages, or other protocols for other applications. While the description is focused on data applications, the context also applies equally to voice applications. The context gives details for the specific request. Sometimes it can be inferred from the destination address, but sometimes further information from the content source itself is used.

2. Location 720: This includes location information for the user at the time of the request. The location information could be at different granularities, including exact address, cell sector, triangulation, etc. often is available in geocoded data from the mobile network. The location data (e.g. cell ID) is extracted from the RADIUS message at the GGSN/PDSN. The UBP can convert this to a physical location, zip code, DMA code, etc. depending on the granularity desired.

3. Demographics 740: This includes subscriber information. The information can be either available in raw format from the mobile operator or in some sort of groupings such as "male, 15-25", "male, 35-50, middle income", etc. If processed information is not available, the UBP can categorize information before storing it internally. Other demographic information also includes service plan type e.g. prepaid or postpaid. The location data can be extracted either from a second database, indexed by the mobile number, or it could be extracted from a RADIUS feed, if inserted by some carriers.

4. Network Info 730: The instantaneous speed can be determined to send specific information for applications and content to be tailored appropriately. The network speed is typically retrieved from RADIUS parameters.

5. Device Info 710: This information is mostly available from the User Agent (UA) request, but can also be collected and stored for correlation purposes.

6. This is useful to tailor content to device capabilities and also to detect the type of user to gauge type of apps.

7. Voice CDRs, SMS CDRs: Information from other application sources, other than data may also be useful. For instance, voice CDRs give calling patterns so it is possible to target based on a specific 'community'. Simple information such as the 'friends and family' plan data may also be useful for this type of data. The core idea being that it is possible to market certain products and items to specific groups of people.

8. Usage History: The UBP can also derive information about the usage history of a use to do trend analysis. This includes the types and categories of destinations accessed.

9. Presence: Knowing the user's presence information allows additional information to be inferred to customize the experience. Presence information from Presence servers can be used to identify the user's status, i.e. whether or not the user is active on a device, or which device the user is active on if he is connected through multiple devices.

10. Application Logs: Logs from applications such as ringtone servers, ringback tone servers, wall paper or other commerce platforms can all be obtained to get usage information.

Note that this is an example list, other parameters can also be added. An embodiment of the invention describes a scalable platform where additional adapters can be added to collect specific feeds and a data mining algorithm that is flexible to operate on new feeds. Also, as more information is collected, the internal data stored becomes more and more rich and can do more sophisticated historic patterning and trending. Since different feeds change at different frequencies the platform has the ability to configure how often each adapter checks for feeds, whether it is push or pull, etc. For instance subscriber information does not change much, whereas location information changes on a per session basis, whereas stream information changes for every access request. By adjusting the frequency and nature of data collection, the load on the mobile network can be minimized.

This information is all collected and aggregated and a resultant output vector is available that characterizes a specific outgoing stream.

An embodiment of the invention can collect and monitor profiles across these different dimensions. Internet based systems don't have access to all these different feeds accurately and so can't be used to build a holistic profile. As mentioned earlier, location is very granular in mobile networks. By sniffing data from within a network, it is possible to build a profile across all the sites the user accesses, unlike in a on-line world where the data is restricted to the sites the publisher is accessing. Also, the mobile world provides access to a range of different applications such as video, messaging, etc. which help build a more holistic view of the user.

Targeting Logic

Figure 8:
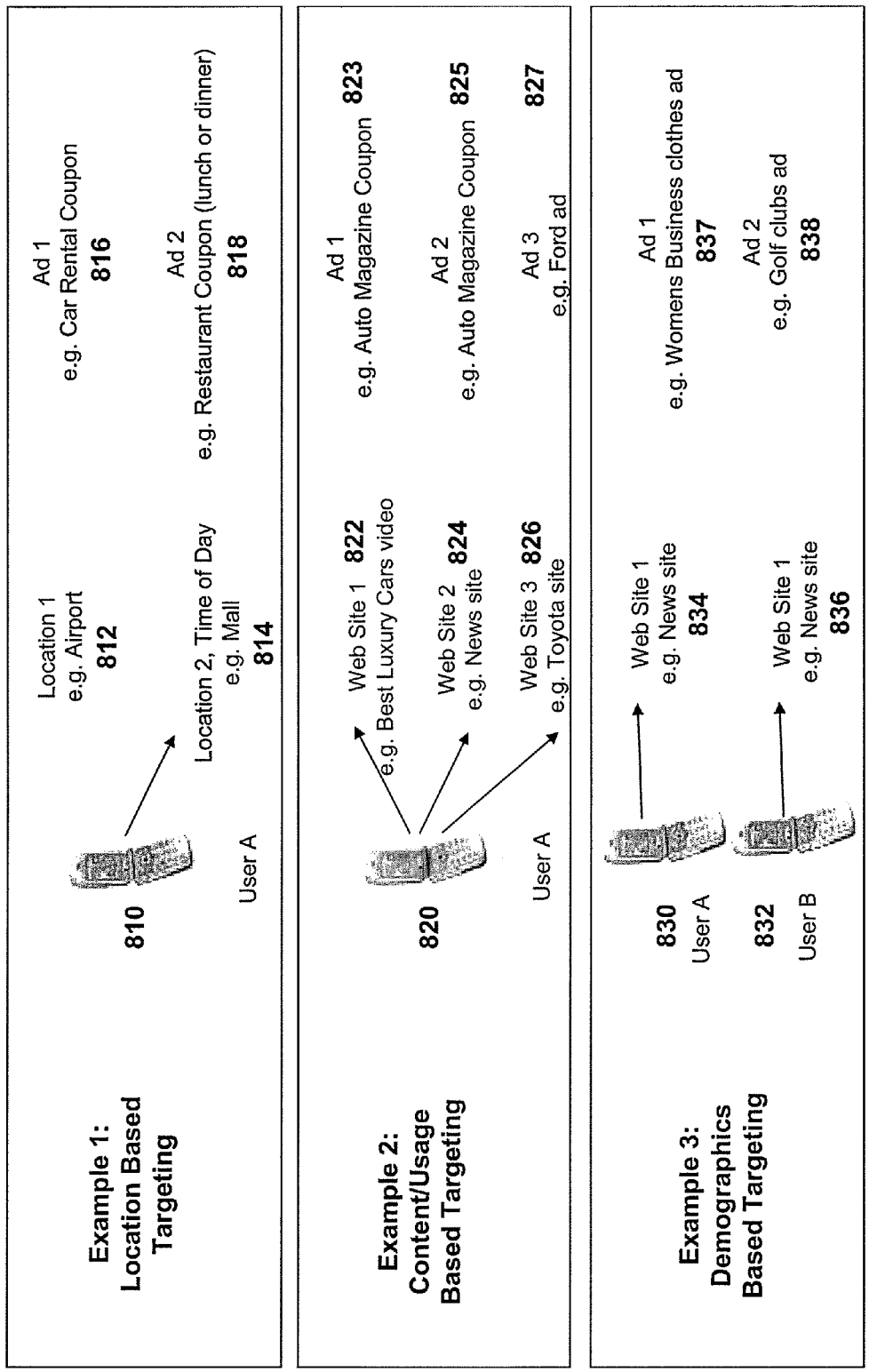
FIG. 8 illustrates the concept of Mobile Behavioral Targeting with the help of specific examples.

FIG. 8 shows some examples of Mobile Behavioral Targeting. Example 1 shows how advertising can be tailored, based on "Location". For instance, user A 810 accesses a news site from his mobile at the airport 812. At this point, an ad corresponding to a Car Rental Coupon 816 could be served since he is highly likely to be renting a car at the airport, especially if we know that the user is at a different airport than his 'home' location. Later, if the same user browsed the same site from a Mall 814, at lunch time in the specific time zone that he is in, it is possible to serve an ad for a Restaurant's lunch special 818. In this example, the specific information of user's current location, home location, time zone in current location, etc. is available from a mobile network.

Example 2 in FIG. 1 shows targeting advertisements based on Content Usage and History. For instance, user A 820 accesses a video for 'best luxury cars of the year' 822. In this case, the content site knows the keyword for the content to be 'automobiles' and today would serve an ad for an Auto Magazine 823, for instance—this is the classic "contextual" advertising technique. However, if the same user then goes to a news site 824, it would now be possible to serve another ad for an Auto Magazine 825. Similarly if the same user now goes to a "Toyota" web site 826, it is likely that "Ford" provides the highest premium ad and would be displayed 827. This cross-targeting allows much more powerful brand messaging. However, if this historic behavioral information is not available, it is not possible to accomplish this. Such cross-domain historic information can only be obtained from the mobile network (or mobile device) since it is the one place that has visibility into all the traffic going through the network. Such cross-site information is not available at a content server. One way to achieve this is through cookies, but that requires dependencies on the client and also requires participation from content providers. What's unique on the mobile is that this can be accomplished without any dependencies. Further, the same example can be further extended in the mobile scenario where the user also sees an automobile related ad in a SMS message, thus tying in content history across applications.

Example 3 in FIG. 1 shows targeting advertisements based on "Demographics". In this case, two users A and B go to the same content site. It is known, however, that user A 830 is a female with a certain income level. In that case, an ad for women's apparel 837 might be displayed. If user B 832 is a male with an interest in sports, an ad for Golf 838 might be displayed. This targeting is possible due to demographic information that is available on the mobile network, without having to infer from user behavior.

While each of these examples described a few dimensions used in targeting, it is possible to use combinations of dimensions to create a much more context specific advertisement. For instance, in Example 1, the Mall Ad displayed could also be related to a specific clothing or sports item related to the user, thus combining location and demographics.

Another example of targeting is to analyze the behavior of a user across applications. For instance, it is possible to analyze behavior across ringtones, wallpapers, SMS, etc. A user who buys jazz ringtones and certain types of wall papers might be a candidate to offer new music downloads in that category. It is also possible to analyze SMS traffic for user behavior and to correlate to other dimensions. For instance, notifications from specific short codes can be used to determine user behavior. A user getting notifications from financial institutions and golf scores might be of a certain demographic, for instance.

FIG. 9 shows the different parameters and their possible importance across different applications. The following are meant to be examples and other algorithms can also be derived based on similar parameters. Consider specific parameters: location, demographics, content information, usage history/behavior, and community information as sample parameters.

a. Web: With a Web application (e.g. browsing on a news site), the location of the user, the demographics, as well content history would be useful to target an ad. For instance, knowing that a male of 25-35 years is at Boston airport, and that the user has been looking at Car sites gives a good idea that a sports car related ad may be most relevant for this session. In this case, the community data may be less relevant.

b. Video: Video characteristics are likely to require similar parameters as web traffic.

c. Messaging: In the case of operational messages or promotional messages, knowing demographics or history or location is useful to target the information. In the case of peer to peer messages, knowing the community of users is also helpful to target advertising.

d. Search (Web or Voice): When the user is requesting a search for a specific item, knowing the user's location and demographics would be very helpful to target the ad. So if he searched for pizza, it is possible to pop up an ad for the local pizza place—instead of a national number.

e. Gaming: With a gaming application, knowing who the user is and where he is would be useful for targeting. Further, knowing some history would also be relevant to targeting an ad.

f. Social Networking: In the case of social applications such as messaging or other specific social networking apps, knowing the community is helpful to target a message to a group of similar users. This can also be used to target a specific application across a group of users—e.g. video share app can be targeted to a group of users that seems to communicate a lot on the phone or via messaging.

g. Voice ringtones: In the case of ring back tones, if A calls B, he might hear a ringback tone that characterizes something A likes. If C calls B, C might hear a different ring back tone. The ringtones can be tailored to map user groups and interests as specific advertisements.

h. Wall papers and ringtones or music downloads: Knowing the history of the type of information the user is interested in helps determine what new applications the user may be offered.

The overall targeting logic described above can be used in conjunction with specific applications and partners to generate maximum value.

Some other characteristics of the targeting logic include:
1. Mapping users into pre-defined segments: There are generally several preferred areas for segmenting users. As user information is captured and evolved over time, the users can be mapped into specific segments;
2. Dynamically generating segments: By seeing the real-time behavior of users, patterns of users can be derived dynamically. For instance, if a number of users are seen to access a specific application, it is possible to see the trends of these users in other dimensions;
3. Mapping users into multiple segments: As the granularity of segmentation increases, it is possible to map a user into multiple segments; and 4. Dynamic creating segments: In addition to inferring segments, it is possible to create segments through a policy language.

Privacy Approach: As the targeting and segmentation is done, it is important to maintain user privacy. An embodiment of the invention enables maintaining a user profile securely, and ensuring that only relevant data is shared with appropriate privacy controls. This concept can be thought of as a 'network' based cookie that is maintained by the service provider's network. The cookie is the user's profile that is built over time. Depending on privacy policies, only a subset of this info is exchanged upstream. E.g. while the network cookie would maintain usage history, only a category can be provided to the content partner. Also, by doing this, the user's phone number or any PII need not be exposed upstream.

The network cookie concept allows the carrier to broker targeting information without exposing a user. In traditional targeting, a user's cookie is maintained on a PC and is sent for targeting. In an embodiment of the invention, the user info is stored within the carrier network on the UBP, not at the handset level. This vector can be conceivably thought of as a 'network cookie'. During a brokering transaction, the entire profile need not be shared, and also what is shared could depend on the context. The profile info is shared in the context of the session, and not user. For example, consider two users A and B with phone numbers N1 and N2. Example profiles would be stored along the hash, so as M1=hash(N1) and M2=hash(N2).

<M1, Northeast US, iphone, {categories=sports, news}, demo={M, 35-45, flat rate plan}>.

<M2, Northeast US, iphone, {categories=movies, video games}, demo={F, 18-24, family plan}>.

Now consider user A going to cnn.com in the morning. A possible vector exchanged with cnn could be <current location=Boston, home area=Northeast US, device=iphone>, while a profile exchanged with yahoo could be <current location=Boston, home area=Northeast US, device=iphone, demo={F 18-24}>. In this example, cnn and yahoo could have different policies for amount of data available. If the same user A went to cnn in the evening, a possible vector could be <current location=Andover, home area=Northeast US, device=iphone>. In this example, there is no way for cnn to know that it's the same user A that came in the morning and evening, unless the UBP and carrier chooses to tell cnn. Now if user B went to cnn also, the profile could be <current location=Andover, home area=Northeast US, device=iphone>. There is no way for cnn to know A and B were different users—it only cares about how to target the users. In neither cases is the user's phone number exposed. Instead, the profile is sent based on the context of the transaction and user.

The preferred privacy capabilities in an embodiment of the invention include:

1. Transaction uniqueness: When the UBP shares info upstream, it masks the identity and specifics of the data. This ensures that a specific vector can't identify an individual. Further, the vectors are so generated that repeat transactions from a specific user can't be traced back to the specific user either. This is done by passing a unique session id describing the transaction, not the user. As a result, the content site or application can't track the history of the user through this ID. This is different from 'cookies' where persistence is maintained on the client, thereby exposing the user to other applications. By maintaining the user information within the network, the service provider has the ability to maintain privacy of user information;
2. Data masking: Data stored within the system is also masked so that external queries by phone number or user name won't reveal user information;
3. Privacy and Disclosure policies: Specific Privacy Policies include checking whether the user has opted for targeted advertising, determining what information is sent to which content partner, using selective dimensions for targeting, etc. Specifically, when the targeting information is shared upstream with an application or content site, the policies on the user can be checked. For instance, location data for a specific user may not be shared upstream, while for certain users could be shared. In another example, zip code related information may not be shared with a specific content partner, but could be with another partner. These policies could be based on business relations or user preferences at a per user, per content provider level and can also be changed in real-time;

The UBP has a number of preferred privacy controls. These are listed below as they apply to the different steps of data collection, profile building, and data exchange;

Data Collection
  a. Data is collected off the network, and hence there is no need to generate logs from third party applications. This ensures that user-sensitive information is not distributed through the network
  b. During data collection and processing, masked user IDs are used (through one way secure hash). As a result, no user phone numbers need to be managed
  c. The data collection itself supports opt-out policies for users/URLs/IPs not to be captured
  d. No payload is retrieved, no SSL data looked at Profile building and Storage
  a. User profiles are maintained through hashed IDs, so can't be traced to a specific user
  b. Solution is deployed within carrier infrastructure, so each carrier's data is separate Brokering
  a. Data is brokered on a transaction basis, not at the user level. Partners can access data through policy driven, secure interface
  b. Selective data can be exposed, depending on policies. E.g. demo or location, even in aggregate, can be blocked off
  c. Partners can't see other site's data Technical considerations
  a. Box is secure—no external access to the box, ftp and other services controlled
  b. Secure login, attached to different auth schemes 4. Frequency Capping: It is also possible to cap the amount and extent of user information shared across network, applications, and providers as well as number of times this information is used. For instance, the service provider can decide that information about user A is exposed only Y times in a month at a specific minimum separation, and only Z times to a specific application. These controls can only be applied from the network.

Insertion

An embodiment of the invention describes an approach to pass targeting information without impacting existing applications and business processes. Before we describe how to achieve mobile targeting, as way or prior art, we first describe how advertising is delivered without targeting and then how targeted advertising is done on the Internet for PCs.

Figure 10:
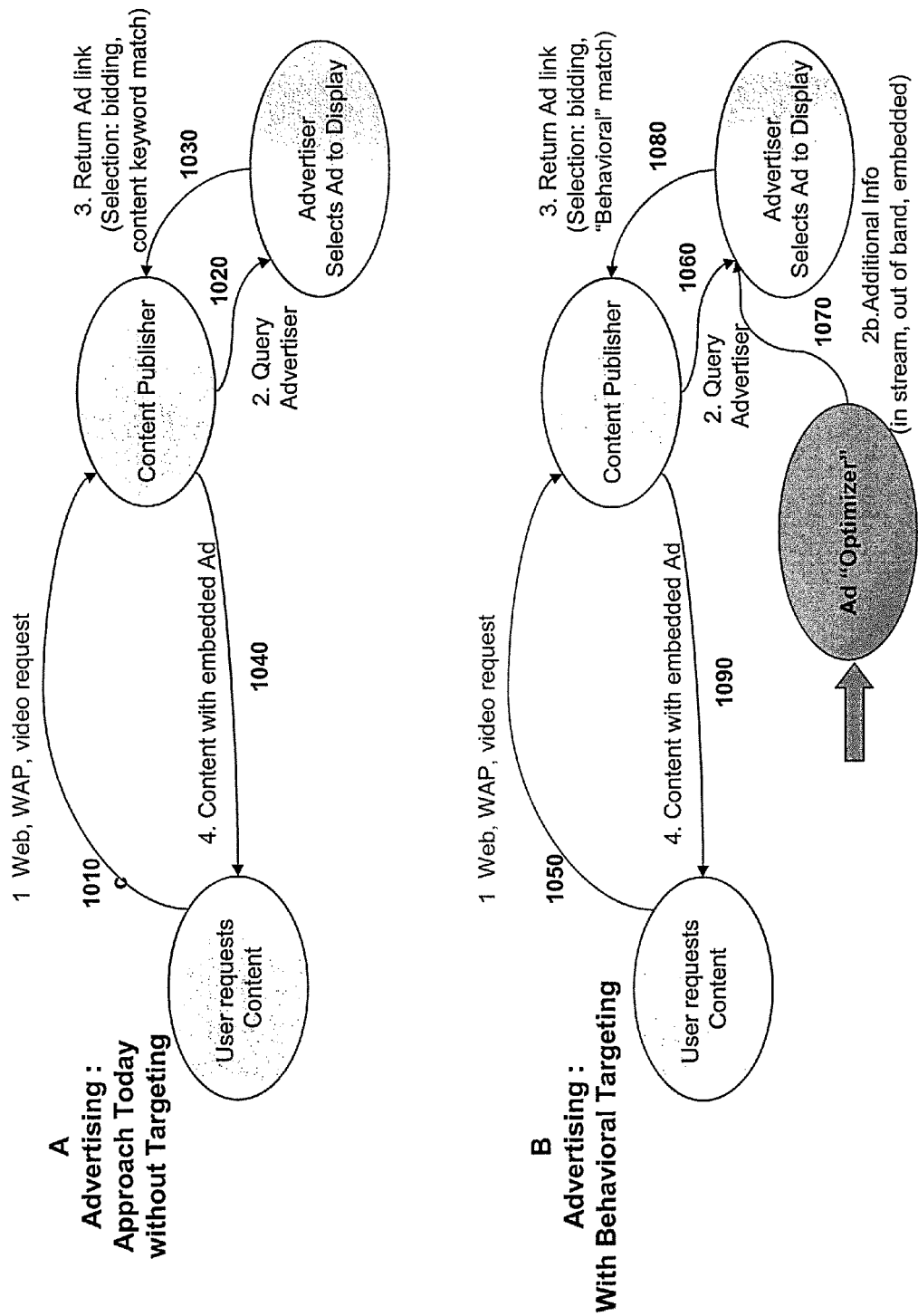
FIG. 10A illustrates current approaches for mobile advertising and FIG. 10B shows how Mobile Behavioral Targeting can be applied to this architecture

FIG. 10A shows a known approach for inserting advertisements into Web pages on the Internet, which is also the currently used approach for inserting ads into Mobile Web pages. When a user requests content 710, the request is sent to the server. The server, in turn, contacts an Ad Server 720 to determine the ad to be inserted. Typically, the ad server selects the ad based on either the content or the keywords, in addition to the bid received from the advertisers and returns the ad or a pointer to the ad to the content server 730. The server then responds to the original HTML request by including the content along with the specific image for the ad 740, or in many cases, a link to the ad being served.

FIG. 10B shows the Behavioral Targeting approach, where the ad inserted is precisely targeted to the user. Specifically, when the Ad server makes a selection for the ad, it takes into account additional "behavioral targeting' information provided by an optimizer 770. While this general approach for "optimizing" the ad can also be used for "mobile" behavioral targeting, the "mobile" aspect differentiates it in how the behavioral information is supplied and what is supplied as behavioral information. Specifically, in the Internet on the PC, behavioral information is supplied via cookies. Further, the information typically involves some sort of PC IP address ID or user ID so that the server can track the same user through multiple sessions. In some cases, the optimizer then uses the IP address to further query a platform like Digital Envoy to determine the location of the user. In the case of mobiles, as discussed earlier, cookies are not reliable and end systems are not powerful like PCs, so other forms of passing information are required. Also, attributes required for mobile targeting can be much richer. Further, mobile targeting can be applied to a number of different mobile apps, not just web browsing—for instance, voice, sms, gaming, tv, search.

Figure 11:
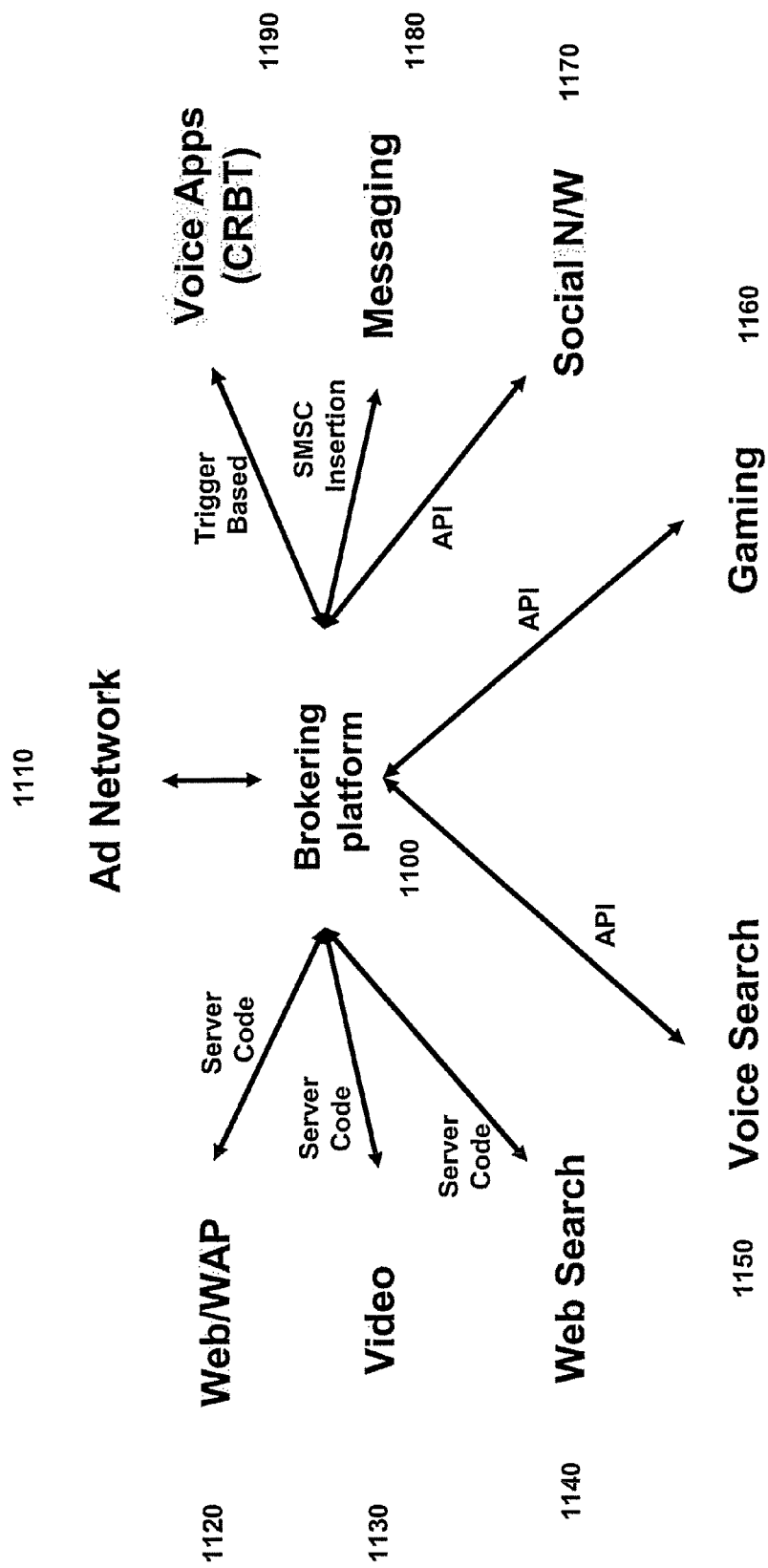
FIG. 11 illustrates how Mobile Behavioral Targeting can be used across a range of applications.

FIG. 11 shows how targeting information can be fed to a number of upstream applications. These include mobile Ad networks 1110, mobile application platforms such as gaming 1160, location based applications, SMS applications, messaging applications 1180, etc. It also applies to voice based applications such as search or ring back tones 1190. An embodiment of the invention describes an approach where once the information is collected, it can be sent to any application that can use this information to either target the advertisements better or in some cases to also better target the application itself.

In addition to feeding this information to existing applications and advertisers, it is also possible to build out an advertising framework itself based on this information. For instance, specific campaign rules can be applied to determine what information is to be targeted and how and then ads can be inserted. Also, this separate advertising network can operate in conjunction with other ad networks where some specialized ads can be served out of this network, while others are served out of existing networks.

When this information is to be shared upstream, specific information about the application, user, content provider, etc. can be considered to determine the information shared. There is also a need for a systematic analysis of the relative importance of some of the parameters. Also, it involves determining how to pass this information at a granularity detailed enough to be of value but also high-level enough so that there is sufficient advertising inventory that fits the characteristics.

Another aspect of an embodiment of the invention is how the collected information can be provided to existing applications so that targeted ads can be inserted. Existing ad insertion technologies focus on how an ad can be physically inserted into the content being viewed. This ranges from simple banner ads on web/WAP pages to pre-rolls and banners on videos. In the case of videos, the challenge is getting the right format for the ad and the content, concatenating them, and displaying them in real-time. In the case of SMS, ads can be inserted by appending text to the end of the text message. Since SMS has 160 characters and most messages are smaller, it is possible to insert ads within the extra bits available in the text message. Ads can also be inserted into other applications such as games or IM applications. In this case, it is required that the application have a method inbuilt to display the ad, while an ad server determines the ad to be inserted. An embodiment of the invention describes a method that leverages existing ad insertion techniques to better target the ads. Specifically, it allows for sharing information so the ad insertion technology can select the 'best' ad—without changing the application or placing any demands on the devices.

a. Insertion into Web Applications

FIG. 12 shows different approaches for passing behavioral targeting information for Web applications.

A. The information can be sent in-line by adding a tag to the HTML request. For instance, a request http://www.xxx.com can be modified 1210 to be http://www.xxx.com?gender=m?loc=123. This requires the UMP to be in-line to insert the code. Alternatively, it can work with a WAP gateway or a similar in-line to device appropriate information. The tags are available at the content server, which can then be passed on to the advertiser as the request is made.

B. The information can be provided out-of-band to the advertiser directly for a specific request. Specifically, in this approach the content server can generate a session tag of sorts in the HTTP response to the client to identify the request 1220. The UMP can track this session tag in the embedded HTML and associate with the outgoing original request. The UBP can then provide the user information with the tag ID to the advertiser, who can use this to retrieve profile data 1230. One limitation with this approach is that it will not provide an ad for the first request since the session tag is provided only in the response of the first page. Specific approach is described later in the document.

C. In another form related to B, the server can request additional information for a specific user 1250 once it receives the HTTP request. The UBP can respond by passing on the optimization parameters. The server then passes this information to the advertiser when it makes a request for the ad. This approach requires a specific way to identify the request seen by the UMP on the outbound stream and the one that is received at the server—especially when there could be NATs or proxies along the way. Specific approaches are described later in the document.

D. The information can be provided through a client side module. The UBP client can have a presence on the mobile devices. The UBP server can determine the information vector for a specific user and send it to the UBP client on the handset 1260 (this does not require the client to run any scripts to determine the tags). The handset client functions as a SHIM on the handset, and inserts the information into the outgoing HTML request at the HTTP level (or into other applications). This approach does not require the UMP to be in-line, but requires a client to be distributed to the handsets.

E. Other approaches are possible, where the server may request a cookie to be set. The UMP sees the request for a cookie to be set for a specific user. While it can't be assumed that the cookie is set in the device, the UMP can maintain the cookie for the user. The UMP can insert this cookie, populated with appropriate information, through an in-line architecture 1270.

Specific details for approaches B/C and E along with another novel approach are described next.

FIG. 13A shows integration with a web browsing application working in conjunction with a 3$^{rd}$ party ad network. As shown, the publisher inserts some code 1330 on behalf of the UBP. This code is invoked when a request comes in 1320. The code queries the UBP server for parameters characterizing the request 1322 and receives response 1324. This then calls the ad server to select the appropriate ad 1326. In this preferred approach, the originating request from the device is correlated with the request received at the content server. Typically the mobile network masks the source IP address at the destination so the IP address seen at the source and at the destination are not the same. To address this problem, two approaches are described, one that uses the HTTP server session ID for correlation, and the other which uses a cookie. Since cookies are not ubiquitous, the session ID presents a generic approach. FIG. 13B shows the integration with a session ID.

Correlation with Session ID:
1. Phone makes a request for a session with a content server 1340. The request has associated with it, an IP address and a destination address
2. The UMP captures the session and tracks the source IP and the destination address 1341
3. The content server is modified to return for all the URLs on this page, an attached session ID associated with this request 1342. (The content server creates this unique session ID)
4. The UMP monitors the response and sees the session ID embedded in the URL for the response to the originating IP address. It stores this session ID with the other information for this user 1343. It also collects other data for this user, including user and location and keyword information. The UMP now has associated the outgoing IP address with the session ID from the content server
5. The user makes a second request to the same destination. 1344
6. Before delivering the HTML response, the content server requests the UBP for parameters for this user characterized by the session ID. 1346
7. The UBP returns the parameters for the session ID 1347
8. The content server can now embed an appropriate ad or modify the content in the response before sending the HTML. 1348
9. This approach requires the content server to create and append the session ID
10. FIG. 13C shows an alternative approach that uses cookies for the purpose of correlating the IP address.

Cookie-Based Correlation:
1. The user makes a HTTP request to the server 1349
2. The UBP tracks the user with IP address and destination 1350
3. The server sees that a cookie is not set and sends a set-cookie request 1351
4. The UBP tracks the cookie and appends it to its internal information for this user 1352
5. The user makes a second request, now with an embedded cookie 1353
6. The server queries the UBP for information using the cookie as the query term 1355
7. UBP returns parameters associated with user 1356
8. The server then responds with an appropriate ad 1357.

Another design that does not require cookies or session IDs is described next. In order to describe how an embodiment of the invention works, we first describe the operation of such a system without the technology described in the embodiment of the invention, as shown in FIG. 13D:
1. An Advertiser (e.g. Ford Auto) creates its ad (e.g. ad123) and hosts it on an ad server (e.g. doubleclick.com). The advertiser works with a content server partner (e.g. cnn.com) and gives it information that the ad123 should be displayed X number of times, based on the campaign it is working on. The Advertiser gives the content partner a pointer to the ad as 'adserver.com/ad123' (1358)
2. User requests the web page at cnn.com 1359
3. The content server computes which ad is to be displayed, based on its own advertising logic or through the ad server's logic 1360
4. The content server returns the HTML response to the user with an embedded link pointing to an ad on adserver.com 1361
5. The browser on the device makes a request to adserver.com to retrieve the ad 1362
6. The ad server returns the image of the ad 1363
7. The browser displays the requested content page, including the embedded ad 1364.

Note that in the approach used today, there is no way to 'target' the ad to the requesting user because the user's unique identity is not available at the content server.

An embodiment of the invention describes an approach where the ad can be targeted to the user. Note that while the approach describes targeting an ad, the same technology could also be used to target the contents of the page displayed as well.

The approach described in an embodiment of this invention entails the content server requesting the ad from ad.umber.com. The ad logic and ad could be implemented on ad.umber.com if the carrier is managing its own ad network. Alternatively, the ad logic and ad hosting can be managed at the ad server, with the UBP providing the parameters to the ad logic at the ad server. This approach requires only a one-time change at the content server requesting the ad from the UBP. In the preferred approach, the UBP sits in the mobile network and hence has access to the user's unique IP address, which it uses to derive behavioral information. Depending on where the ad is physically hosted, the approach can be implemented in different ways:

Assuming the ad is hosted on the ad server and the ad server manages the advertising logic, the approach works as follows (FIG. 13E):
1. The Advertiser (e.g. Ford Auto) creates its ad (e.g. ad123). The ad is hosted at the ad server adserver.com as is done today. The advertiser works with a ad that the ad123 should be displayed X number of times, based on the campaign it is working on. Specific ads are hosted on adserver.com 1365
2. User requests the web page at cnn.com 1367
3. As the user request goes out, the UBP monitors the IP address of the user and retrieves the parameters associated with this user 1368
4. The content server returns the HTML response to the user with an embedded link pointing to an ad on ad.umber.com 1369
5. The browser on the device makes a request to ad.umber.com to retrieve the ad. The request arrives at ad.umber.com from the user's device with the original IP address (since the UBP is sitting within the carrier network) 1370
6. The ad.umber.com module in the UBP queries the UBP for parameters for the IP address 1371
7. The UBP returns the parameters characterizing the request (e.g. age, demographics, location, behavior history, etc.) 1372
8. The ad server selects the ad 1373 and returns the image to the browser 1374
9. The browser displays the originally requested web page with the appropriate ad embedded in the page 1375.

Assuming the ad is hosted on the UBP along with the ad selection and campaign management logic, the approach works as follows (FIG. 13F):

1. Umber works with the content provider that ads should be managed by Umber and all ad requests point to ad.umber.com. Umber works with advertisers to get ads, e.g. Fords' ad is ad123. The ad is physically hosted at ad.umber.com or at a Content Delivery Network CDN 1376
2. User requests the web page at cnn.com 1377
3. As the user request goes out, the UBP monitors the IP address of the user and retrieves the parameters associated with this user 1378
4. The content server returns the HTML response to the user with an embedded link pointing to an ad on ad.umber.com 1379
5. The browser on the device makes a request to ad.umber.com to retrieve the ad. The request arrives at ad.umber.com from the user's device with the original IP address (since the UBP is sitting within the carrier network). 1380
6. The ad server in the UBP queries the UBP for parameters for the IP address 1381
7. The UBP returns the parameters characterizing the request (e.g. age, demographics, location, behavior history, etc.) 1382
8. The UBP then generates a redirect message to the ad server with the associated parameters 1383
9. The client requests the ad from the ad server with the parameters 1384
10. The Ad server returns the ad image 1385
11. The browser displays the originally requested web page with the appropriate ad embedded in the page 1386.

Because ad.umber.com is preferably in the carrier network, it has access to the IP address and can hence pass the required behavioral information to the ad selection logic. The logic itself could be managed by the UBP or by a $3^{rd}$ party ad server. This approach allows a content provider to just point its ad requests to ad.umber.com, which then either sends the ad if it has the ad logic embedded in it, or points to the adserver.

One additional design that has to be brought into this system is that all mobile networks may not have a UBP. From a consistency perspective for content providers, it is important that the design work even for users that request the content page from such networks.

Figure 14:
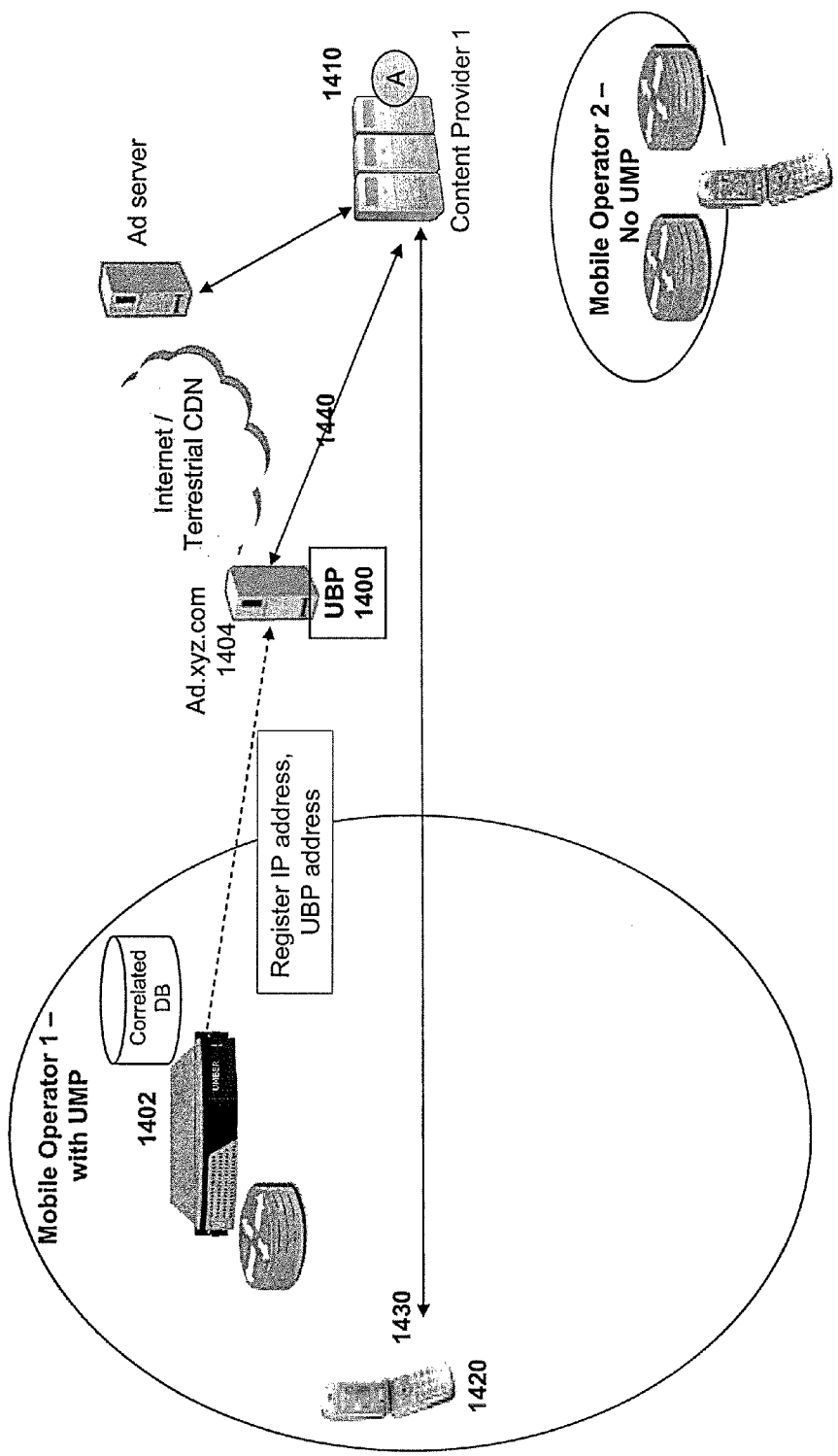
FIG. 14 shows a System Deployment Architecture with and without UBP in operators.

The overall system architecture for that is shown in FIG. 14. The UMP 1402 is deployed in carrier networks. The UBP 1400 is in the Internet, along with ad director ad.xyz.com 1404

1. When operators have the UMP 1402 deployed, the UMP registers IP addresses for the users it sees with the umber broker 1400
2. The content partner 1410 points ads to ad.umber.com 1404, which is hosted at a public place so that it can be accessed from any carrier
3. The user 1420 requests a page 1430 at the content partner site, which returns a pointer 1440 to ad.umber.com
4. The ad request goes to ad.umber.com 1440. The ad.umber.com server then determines which provider the ad request is coming from (this is possible even if the actual request is proxied at the mobile operator)
5. If the request comes from a carrier network that has a UBP deployed, the request is redirected to the UBP 1400 and the rest of the sequence follows as described earlier in FIGS. 13E and F
6. If the request comes from a network that does not have a UBP, then ad.umber.com either returns an ad itself based on limited information it has or it redirects the request to an ad server.

Note that this approach works assuming that mobile pages are delivered separately from the content provider, i.e. non-mobile page requests don't come to Umber. In case even non-mobile requests come to the ad.umber.com server, the server can detect whether or not the user agent is mobile and then pass the request to a non-mobile ad server.

Figure 15:
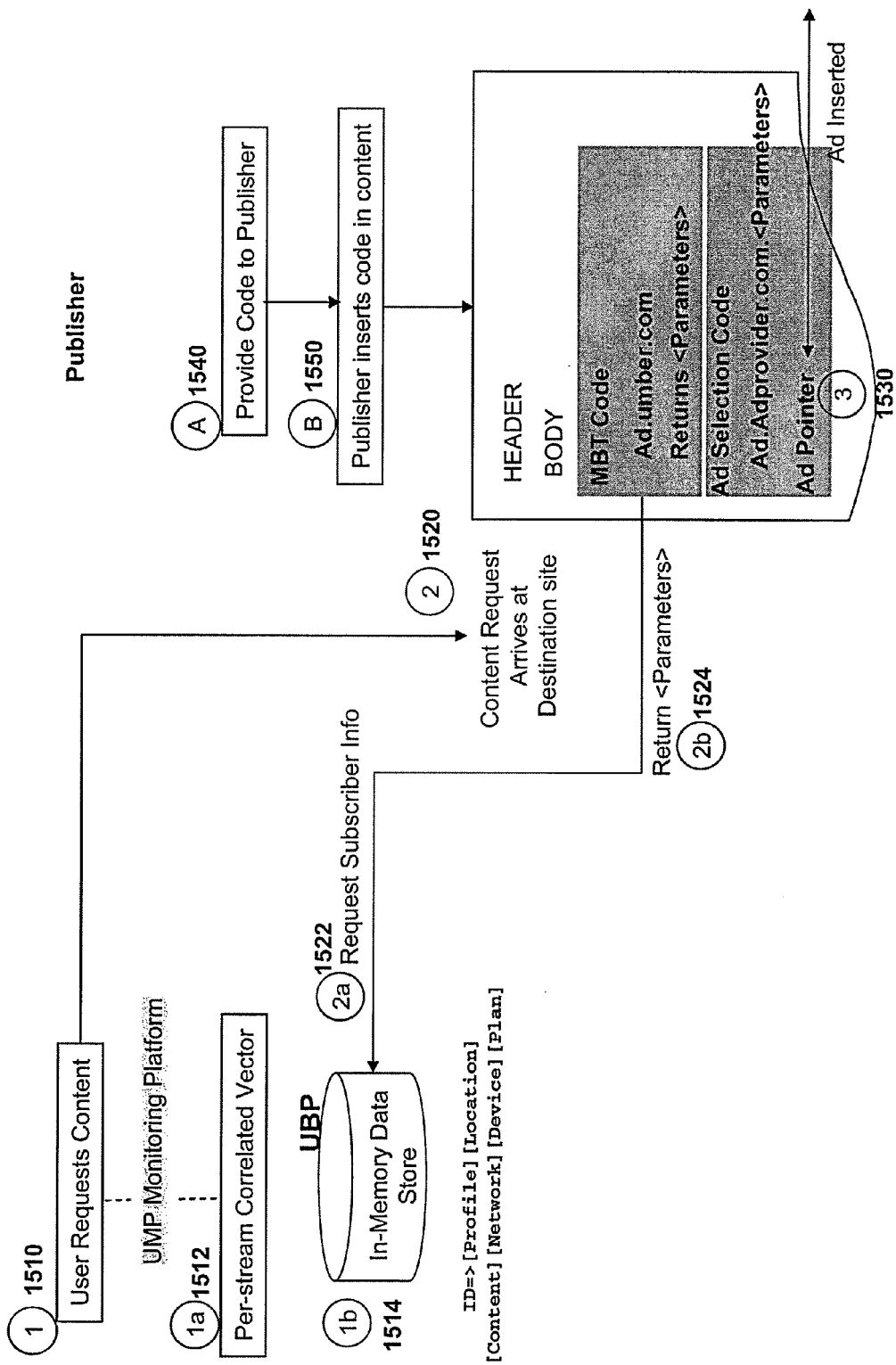
FIG. 15 illustrates an approach for Mobile Behavioral Targeting for Web/WAP applications, with an integrated Ad Network.

FIG. 15 shows the same example as in FIG. 13A with the difference that it has an integrated ad serving platform. In this case, the ad selection code is with the same platform 1530.

Using Mobile Info for Optimizing PC Ads

Figure 16:
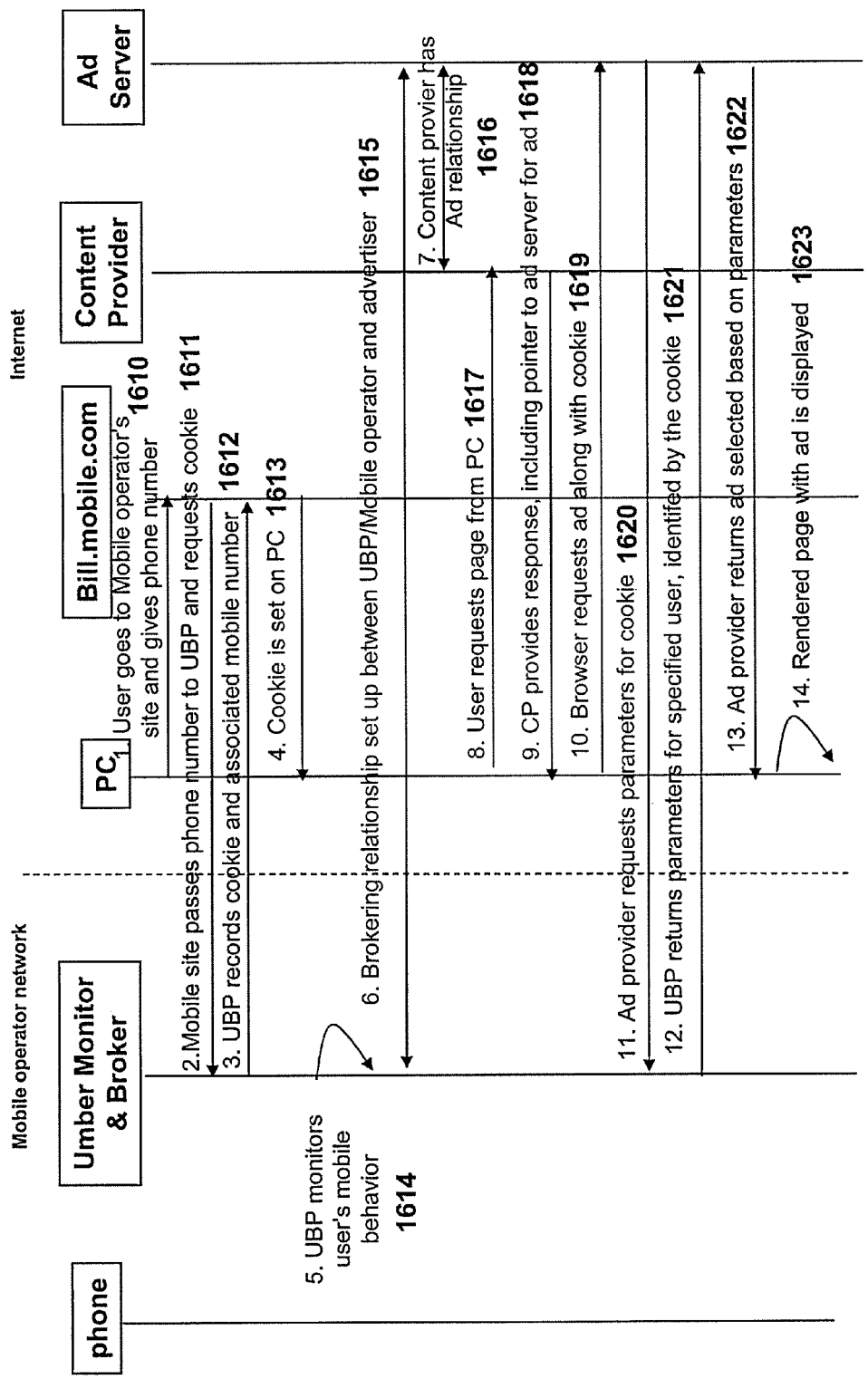
FIG. 16 shows targeting in non-mobile pages with mobile information.

While the preferred embodiment of the invention has described an approach to optimize mobile ads based on mobile behavior, it is also possible to optimize non-mobile ads based on mobile information. The approach is shown in FIG. 16.

In this approach, the user's mobile behavior is preferably linked to a specific PC via the mobile operator's portal 1. User goes to mobile operator's web site. This could be to pay a bill, or through a SMS or message sent by the operator, directing the user to the operator's home page. The user provides a phone number, either as part of entering the user's account or through an operator query 1610
2. The Operator's web page requests Umber to create a cookie for the user's phone number 1611
3. UBP returns a cookie to the web site 1612
4. A cookie is setup on the user's PC 1613. (Note that to respect the user's privacy, this cookie does not contain the user's phone number, but is a masked version of that data.)
5. As the user proceeds with mobile specific transactions, the UBP monitors the user and updates the subscriber profile with behavioral information 1614
6. The operator/UBP sets up a relationship with advertisers that want to use the mobile information for optimizing PC based transactions 1615
7. In parallel, content providers set up a relationship with advertisers—this is the usual process and is done independently of UBP or the mobile operator. The advertiser could offer premium advertising services to content partners that want to behaviorally target the ads. As part of this premium relationship, the content provider agrees to put a piece of code in the page where the ad is requested advertiser.com 1616
8. The user requests a web page from the PC—the web site belongs to one of the content providers that have signed up with this mobile-targeted advertising service 1617
9. The page returned from the content provider includes pointer to the ad server to retrieve the ad and a request to pass the cookie 1618
10. The PC browser returns the cookie to advertiser.com 1619
11. Advertiser requests UBP for parameters associated with the cookie 1620
12. UBP returns the parameters for the user associated with the cookie 1621
13. Advertiser selects appropriate ad and passes image to the browser 1622
14. Browser displays the originally requested web page, with the targeted ad embedded into it 1623.

As described earlier, the preferred approach is to tie the PC to the user's phone number (through the operator portal), inserting the cookie associated with this user, and returning mobile behavioral information when the user goes to an associated content site.

While this specific approach shows how mobile behavior can be used to enrich PC advertising, those skilled in the art can imagine that this approach can also be used to enhance other media of advertising through such cross-media information. Examples include enhancing IPTV or TV advertising.

The previous discussion showed how ads can be inserted into web pages. The technology described here is not limited to web, but can be used to optimize ads in video, voice, etc. These approaches are discussed next.

b. Insertion into Video Applications

FIG. 17 shows the insertion of information with a video application. The approach is similar to the web scenario in that the server queries the UBP for targeting info. A client 1704 requests video from a server 1702. The request passes through routers 1706 (e.g. a GGSN). The UBP monitors the requests and determines the user's profile. The video server, on receiving the request, queries the ad server 1709 for an ad. The ad server in turn queries the optimization module in the UBP 1708 for the profile info and determines the best ad. The ad is returned to the video server, which in turn inserts the ad and delivers the content with the embedded ad.

Since video formats can vary a lot, the ad selection and insertion process is slightly involved. Specifically, the ad server selects the right ad based on the profile in step 1710 (e.g. a Ford XYZ ad). The video server determines the format of the content (resolution, encoding scheme, etc.) in step 1720. For the selected ad, the appropriate format of the ad is then selected in step 1730 (e.g. Ford XYZ ad in format mpeg for resolution QCIF). This ad image is then concatenated to the video in step 1740. The full video with the embedded ad is then served in step 1750.

Figure 18:
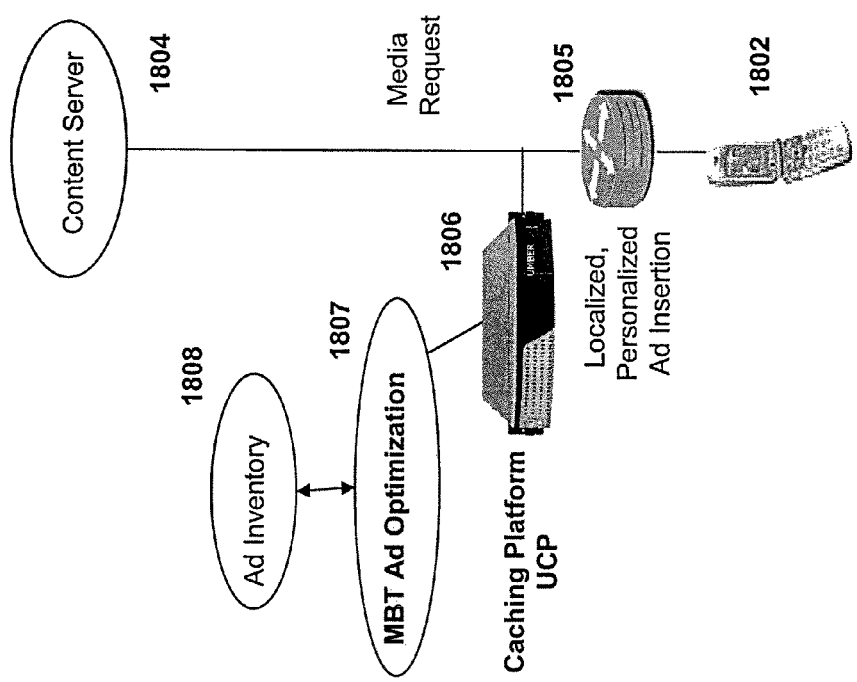
FIG. 18 illustrates an approach for Mobile Behavioral Targeting through caching.

FIG. 18 shows insertion with an embedded cache. A cache based application comprises of the UBP with a local cache. The cache has internal information about the user request based on the parameters and when serving the content out of the cache it can insert the appropriate ad. This approach applies to video as well as other content.

Caching for video is being considered in mobile networks for optimization. In this case, serving the ad becomes more involved. The client 1802 requests a video from a video server 1804, which could flow through a router 1805. The content could be designed to be cached. So the router could request the content to the Umber Cache (1806). If content is cached, the cache could serve the content. If it serves cached content, while serving the cached content, the ad optimization module 1807 retrieves the user profile and selects the appropriate ad from the ad server 1808. The UCP then concatenates the ad and delivers it to the user. Appropriate format selection of the ad could be done similar to the approach used in FIG. 17. If the content is not cached, the content server serves the content with an ad and the cache caches the content for subsequent accesses.

c. Insertion into Messaging Applications

Figure 19:
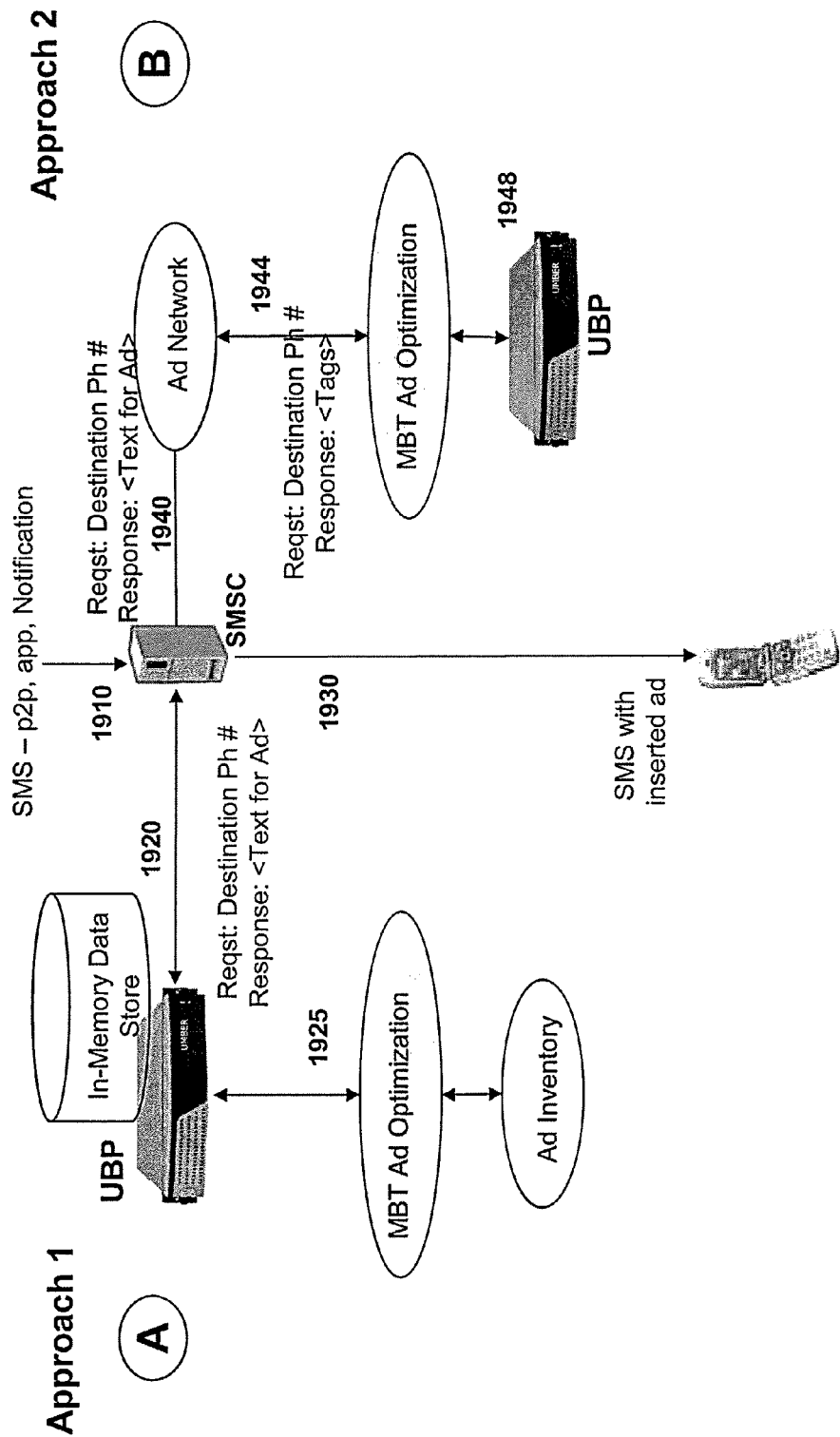
FIG. 19 illustrates an approach for Mobile Behavioral Targeting for SMS applications.

FIG. 19 shows integration with SMS applications. In (a), the ad network is associated with the UBP. The SMSC sends a request to the UBP with the user mobile number. The UBP computes targeting parameters and selects the appropriate ad, which it sends to the SMSC for insertion. In (b), the SMSC contacts the ad network, which in turn queries the UBP. The UBP provides targeting information so that the ad network can select the appropriate ad.

Approach 1 (FIG. 19A)
1. SMS Arrives at SMSC 1910
2. SMSC requests Ad from UMP through mobile number 1920
3. UMP MBT determines user <tags> and appropriate ad is selected and ad text is returned to SMSC 1925
4. SMSC inserts text into SMS and SMS with inserted ad is delivered to mobile 1930.

Approach 2 (FIG. 19B)
1. SMS Arrives at SMSC 1910
2. SMSC requests Ad from Ad Network by passing Mobile #1940
3. Ad network passes phone number to MBT module 1944
4. MBT returns <Tags> characterizing user, Ad network selects appropriate ad, and Ad network returns text to SMSC 1948
5. SMSC inserts text into SMS and SMS with inserted ad is delivered to mobile 1930.

d. Insertion into Generic Applications

Figure 20:
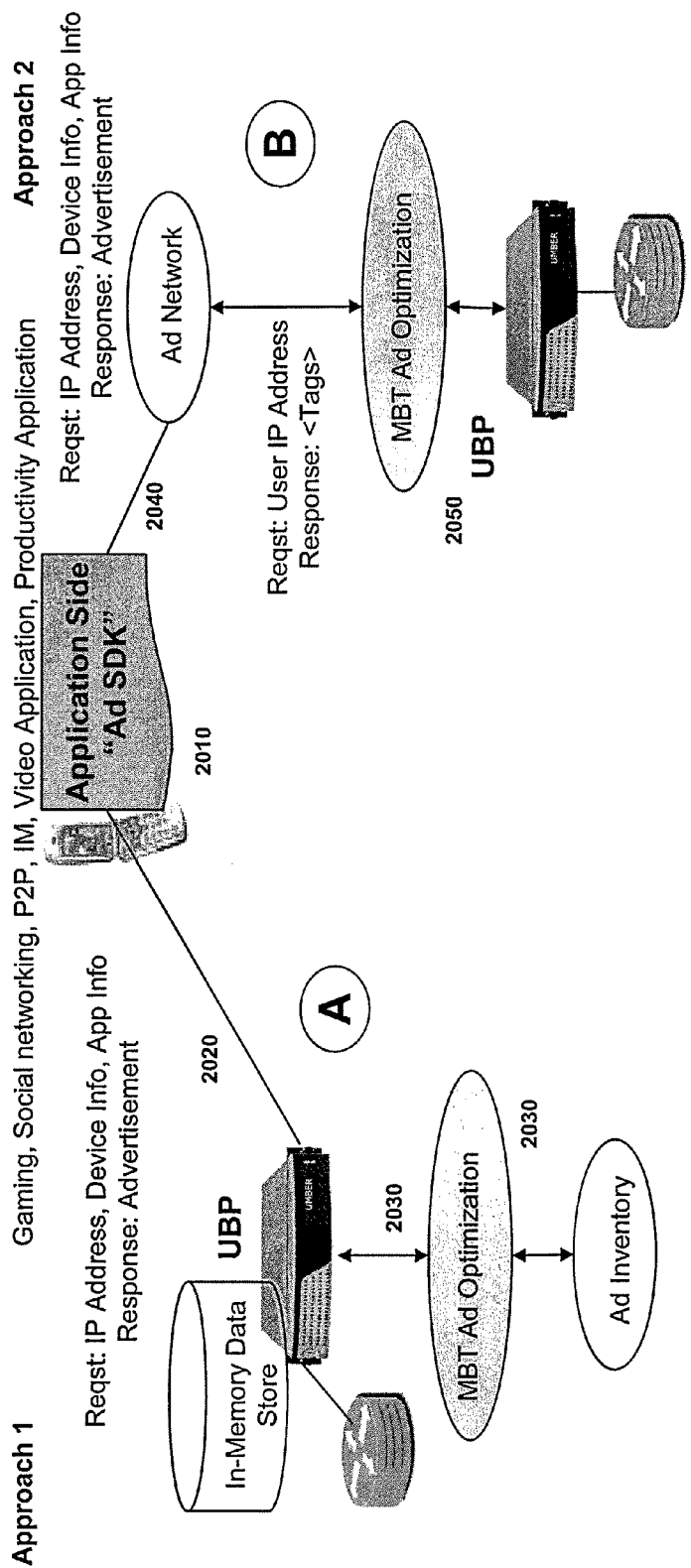
FIG. 20 illustrates an approach for Mobile Behavioral Targeting for Applications through an API.

FIG. 20 shows integration with generic applications through an API. This is an example where a generic application needs to insert ads. In this case, the application 2010 has an API that makes a call to an ad server to select the right ad. As shown in FIG. 20-A, the ad can be served by the UBP 2020, which retrieves the targeting information and selects the ad 2030. Alternatively, as shown in FIG. 20-B, the ad can be served by an external ad network 2040 that uses the UBP 2050 to determine the targeting information before selecting the ad.

e. Insertion into WAP Gateways

Figure 21:
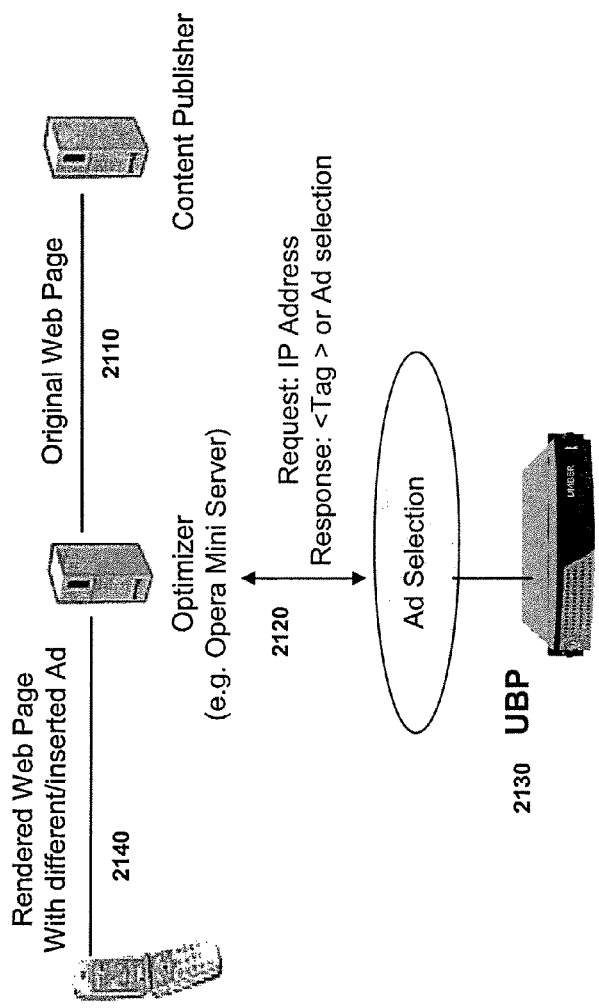
FIG. 21 illustrates an approach for Mobile Behavioral Targeting in conjunction with $3^{rd}$ party in-line gateways.
Figure 22:
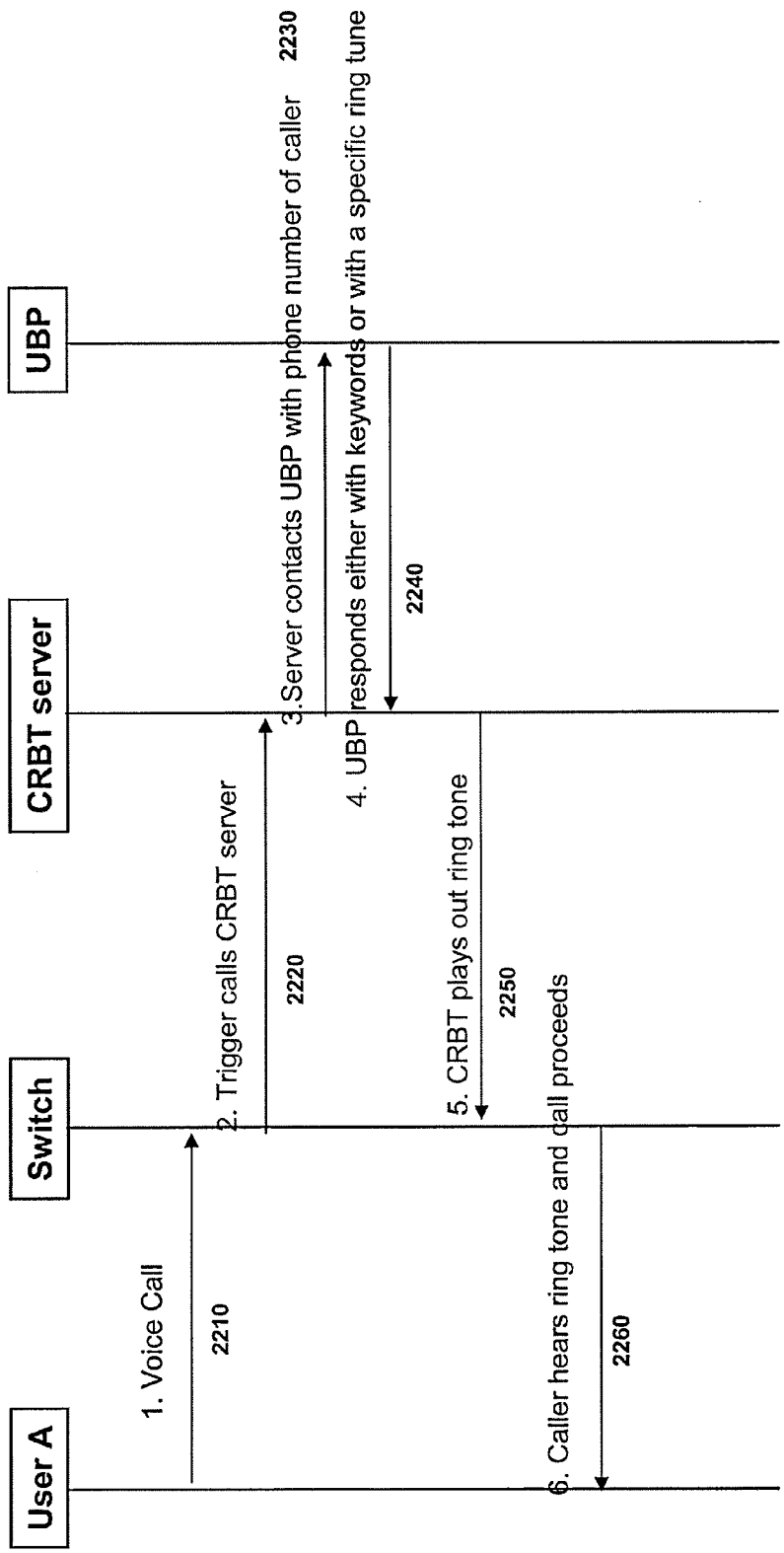
FIG. 22 shows the insertion into a voice based application.

FIG. 21 shows integration with inline products such as proxy servers or WAP gateways. In this case, the web request goes to the Internet as in step 2110. In parallel, the gateway queries the ad selection engine for the ad to be inserted, 2120. The ad selection engine then passes the IP address and information to the broker in step 2130. The broker maintains a mapping of IP address and phone number, retrieves the appropriate profile, and provides the information to the ad selection process. The ad selection process then selects the appropriate ad, which gets inserted before the page is displayed back to the user in step 2140. Alternatively, the gateway can insert the targeting parameters inline to send to the advertiser outside the network.

f. Insertion into Voice Applications

It is possible to use the targeting capability to provide target ads to voice applications such as ringback tones. As an example of ringback tones, consider the following example: When user A calls user B, user A hears a specific caller ringback tone that user B has designated. However, it is possible to provide a targeted ringback tone containing an appropriate Ad. In this case, user A calls user B as in step 2210. The switch generates a trigger 2220 to the Caller Back Ring Tone (CRBT) server. The CRBT server in turn contacts the broker 2230 with the user's phone number. The brokering platform returns a profile 2240 for this user. The CRBT platform then selects an ad appropriate to the user based on the profile and plays out the appropriate ad 2250. The caller A hears the targeted tone 2260 and proceeds with the call. This analogy can be extended to providing a message prior to any voice applications.

Operation of a Carrier-Centric Ad Exchange

Figure 23:
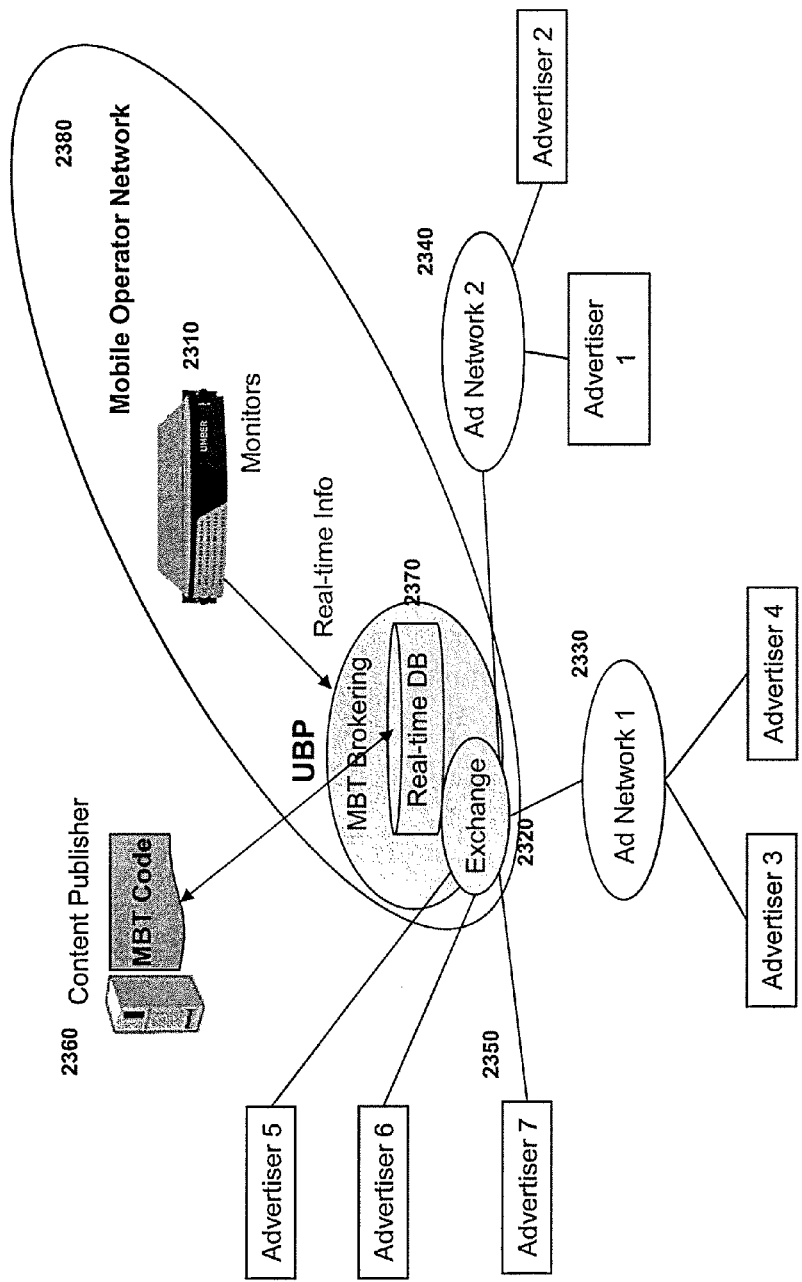
FIG. 23 illustrates how a carrier-centric ad exchange can be built on top of the existing UBP solution.

The UBP solution can also be used by a carrier to develop an ad exchange or an exchange of ad networks. FIG. 23 shows the concept that a mobile operator 2380 can build subscriber profiles by using information collected by Monitors 2310. When serving content to mobile users, it can provide an ad request to a set of ad networks (2330, 2340) or to individual advertisers 2350 for the specific user. The network that responds with the best bid can be used to select the ad. The carrier would then work with publishers 2360 to provide the actual ad. The brokering platform 2370 builds the profiles of users and then uses the profiles to request and furnish the appropriate ad in real-time.

Fit within Existing Ad Server Platforms

Figure 24:
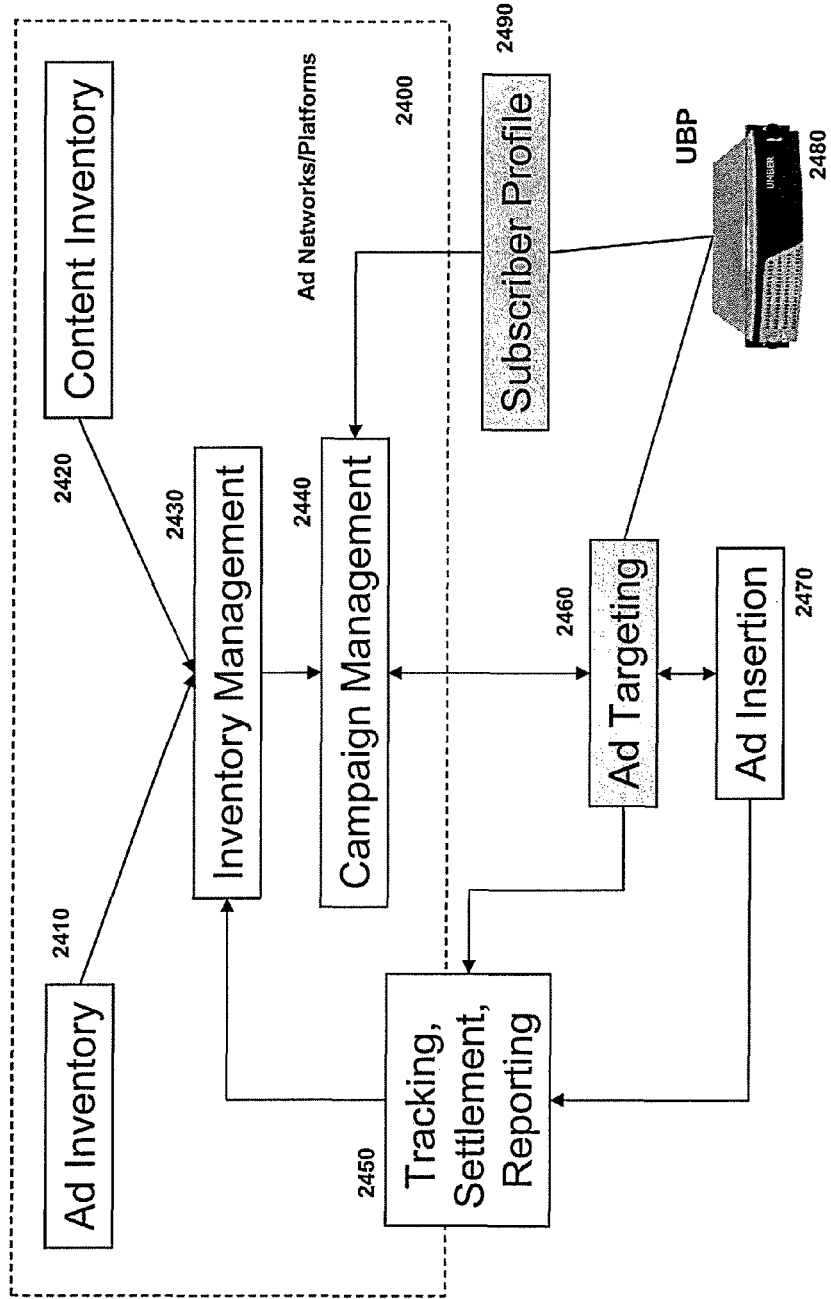
FIG. 24 shows how the UBP fits within an existing Ad architecture.

The technology provided by the UBP fits into existing Ad server architectures. FIG. 24 shows a typical ad server that includes inventory management (2430), collection of Ad (2410) and Content inventory (2420), and campaign management (2440), along with reporting and settlement (2450). Insertion of the ad itself could be done by the ad server or by any other technology. The UBP fits into such an architecture by providing four different capabilities 1. Targeting Logic (2460): The Ad server can provide a specific campaign description to the UBP, which can decide which users map to that profile. This enables the campaign to be directed to the targeted list of users
2. Enhancing Subscriber Profile (2490): The UBP through its real-time data collection method can continuously update the subscriber profile. This information can be used by the campaign manager to select users that map the profile
3. Enhanced insertion (2470): In another approach, the ad insertion logic can query the UBP in real-time to provide parameters for a specific user so that the ad can be targeted in real time. The specific approaches described earlier in this document outline how this can be done without changing existing applications or requiring new software
4. In addition, the UBP can also provide additional auditing and measurement of user responses for reporting and settlement purposes (2450).

Client-Based Architecture

In addition to the network based architecture described earlier, it is also possible to provide a similar behavioral targeting solution through distributed agents. Such a solution will likely be deployed outside the carrier network. However, it is also possible to deploy this within the carrier network, or as a hybrid approach where some phones have such a client and other phones do not.

In this approach, client software is distributed to phones. The client is basically a shim, i.e. a brokering client on the handset, and does not typically involve the user and is non-intrusive. The client can be distributed to phones in one of several ways: (a) can be bundled with some applications (e.g. games, or video applications) (b) can be bundled with the OS by partnering with device vendors (c) can be explicitly downloaded by users (d) in the case of carrier involvement, it can be a firmware upgrade to the device.

The role of the client software is to collect some information on behalf of the UBP.

The UBP platform is similar to the architecture shown earlier—a new data collection adapter is added, which receives information from clients.

The UBP ecosystem involves partnering with content providers/application providers/ad networks that wish to receive targeted information. The content provider/application provider inserts additional software on their servers to query the UBP for information as needed.

Set up:
1. Shims are distributed to phones. Optionally, the shim can query the user to provide demographic information through an opt-in. The user may opt-in for several reasons, including being part of a specific application or because they may receive promotions or targeted information. The shim registers with the UBP, which creates an ID for the device
2. Content providers sign up for targeting service and include code to query the UBP.

Figure 25:
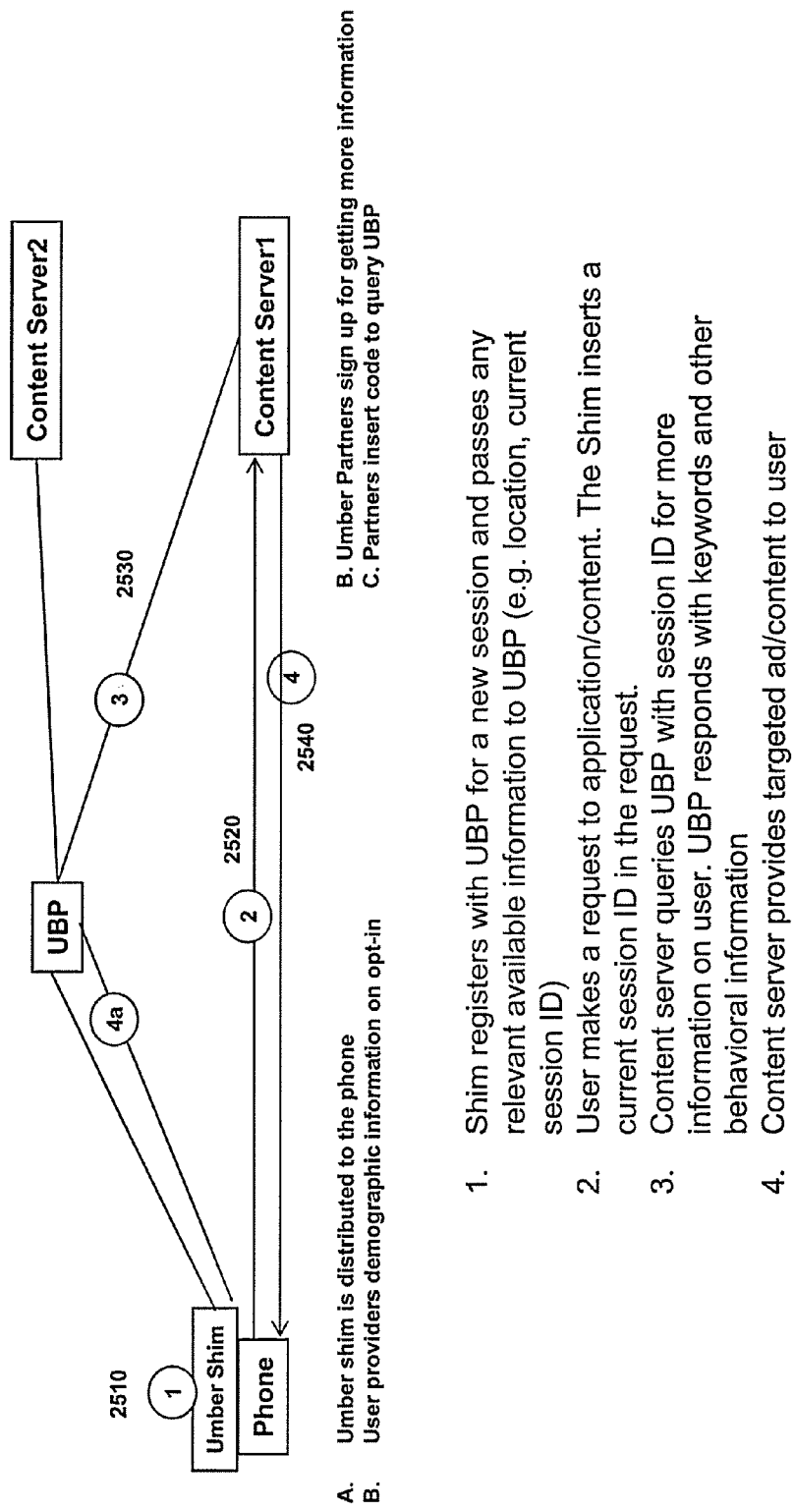
FIG. 25 shows the architecture for a system that can be deployed with clients, outside a carrier network.

FIG. 25 shows the Client-based Targeting Operational flow:

1. User starts a new session in step 2510 (a session could be an application or a web session). The shim generates a temporary session ID and sends that to the UBP. While the UBP has the static identifier, the temporary session ID is used for the session to exchange information with content partners. The shim also sends any other data it can collect, including location, time, etc.;
2. The user starts accessing the desired application. Depending on the application, the shim inserts the temporary session ID in step 2520. For instance, in a gaming application, or a video application, the session ID is passed to the server. In the case of a web application, the session ID is passed embedded in the URL;
3. Due to the partnership, the content server knows where to receive the identity information and its semantics. The server queries the UBP in step 2530 for information on this user. The UBP responds with relevant information, depending on the policy and application. This information could be user info, keywords from participating sites, location data, etc. Alternatively, the UBP could also instruct the shim to pass specific information in-line to the server;
4. The server then responds to this information and either generates targeted content or ads and uses it in the return response in step 2540.

Thus it can be seen that the analytics and information brokering is similar whether the data is collected from the network or from clients. The differences in the client based approach lie in:

1. Mechanism for collecting information: The information is collected from agents on devices. Other sources of information can also be added to this, such as server logs or real-time data. In a hybrid approach, the carrier data can also be provided to this
2. Ownership of information: The UBP owns the information and can share it effectively with partners based on policies. For instance, keyword information across select CPs can be shared based on groups.

Usage Sequence

Figure 26:
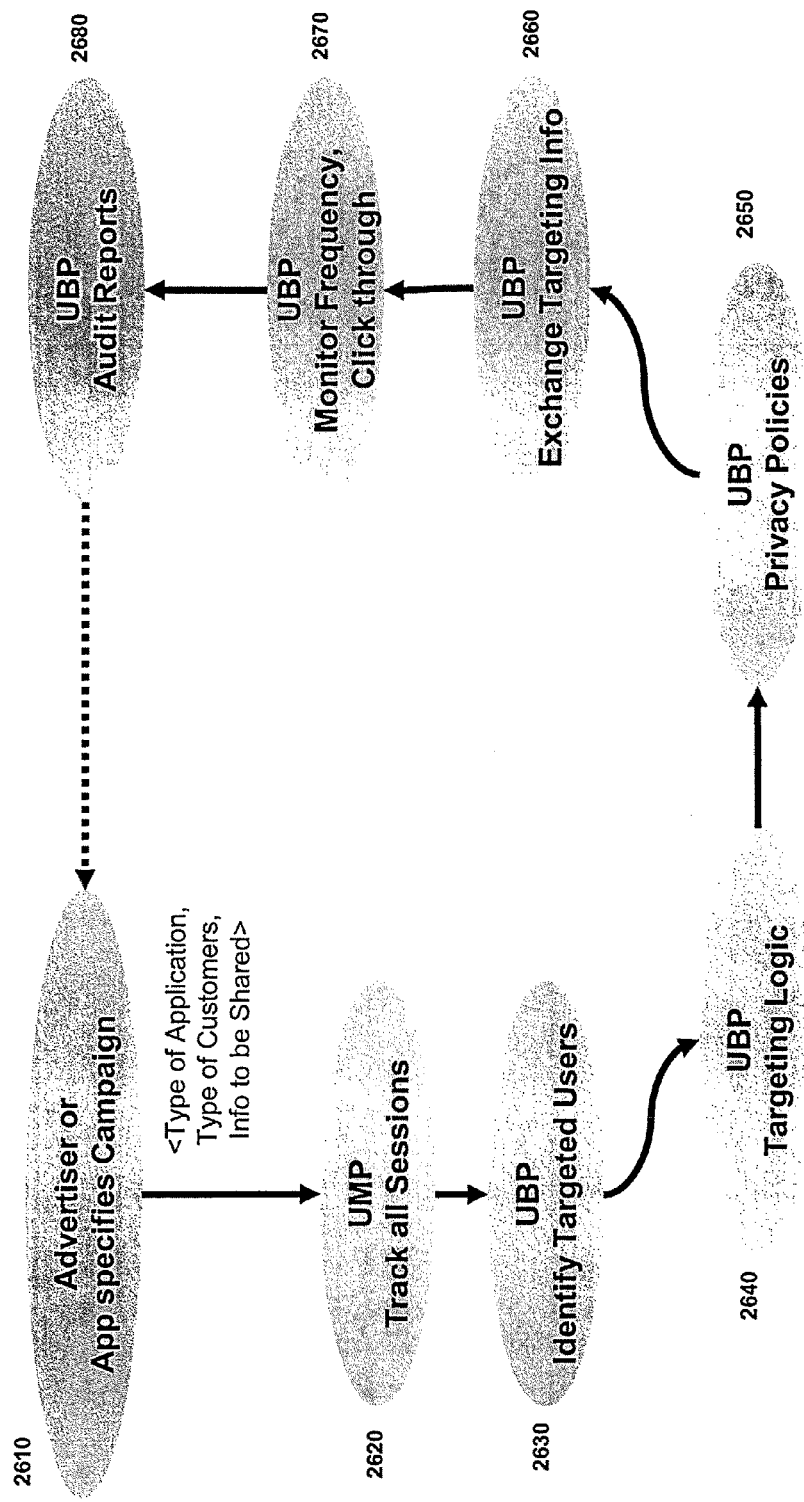
FIG. 26 shows the usage flow for campaign management.

The typical sequence for using the UBP is shown in FIG. 26
1. An application, operator, or ad network specifies the type of campaign to run 2610—what demographics to target, and what information is relevant (Location and content history, for instance)
2. This information is passed on to the Monitor. UMP in step 2620 tracks all requests to this particular application (through protocol, destination address, etc.)
3. As user requests go to this application, UBP in step 2630 identifies users that belong to this category (e.g. specific demographics)
4. UBP in step 2640 determines parameters appropriate to the application being targeted and collects targeting info for selected users
5. UBP in step 2650 determines privacy policies. As information is being passed, UBP also tracks which users have received how many targeted ads so far and can maintain a frequency cap. It will also ensure privacy policies before sharing information
6. In real-time, for users that belong to this category and are accessing this information, UBP in step 2660 passes on relevant information (e.g. location and usage history vector) to the application through one of the different approaches described earlier
7. UBP monitors in step 2670 overall what information was shared, how much was shared etc. for auditing privacy. UBP can also monitor any clickthroughs that go to specific ads in the targeted ads to provide the operator with an audit for settlement purposes
8. UBP in step 2680 generates reports on the overall info exchanged, effectiveness of targeting, etc.

While the above describes a particular order of operations performed by a given embodiment of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium including, without limitation, any type of disk including optical disks, CD-ROMs, and magnetic-optical disks, read-only memory (ROM), random access memory (RAM), magnetic or optical cards, or any type of media suitable for storing electronic instructions.

While given components of the system have been described separately, one of ordinary skill also will appreciate that some of the functions may be combined or shared in given instructions, program sequences, code portions, and the like.

What is claimed is:

1. In a mobile data network, a method for sharing user profiles with content servers so they may select content responsive to a user profile, the method comprising:
   providing a store of user profiles, each profile associating profile information with at least one of a source IP address and a phone number for a mobile device associated with a user, the profile information being indicative of at least the user and substantially all application-level activity continuously captured from the user's usage of the mobile data network;
   detecting on the mobile data network a user request for a transaction with a content provider;
   inspecting the user request to retrieve at least one of a source IP address and a phone number corresponding to a mobile device issuing the transaction request;
   using the retrieved source IP address or phone number to retrieve a corresponding profile from the store;
   correlating the corresponding profile to the transaction in order to mask user identity information from the content provider, the user identity information including at least the source IP address and the phone number for the mobile device;
   in response to a profile request, applying predetermined opt-out rules to determine at least a subset of the retrieved profile that may be provided in response to the request; and
   in response to the profile request, providing the at least a subset of the retrieved profile to the content provider with masked user identity information according to the predetermined opt-out rules, wherein the phone number is masked from the subset of the retrieved profile that is provided to the content provider.

2. The method of claim 1 wherein the profile request originates from the mobile device in a transaction destined for an advertisement server.

3. The method of claim 2 wherein the advertisement server uses the profile information to select advertising content to provide to the mobile device.

4. The method of claim 2 wherein the transaction destined for an advertisement server is caused by a reply to the mobile device from a content server.

5. The method of claim 1 wherein the source IP address and a destination address for a transaction are detected and associated with a user session and wherein a session ID is detected in a reply to the user transaction; and wherein subsequently a content provider makes a profile request using the session ID to identify the requested profile information.

6. The method of claim 1 wherein the source IP address and a destination address for a transaction are detected and wherein a content server replies to a user request with a set cookie message, and wherein the set cookie reply is detected and uses the cookie to associate with a user profile; and wherein subsequently a content provider makes a profile request using the cookie to identify the requested profile information.

7. The method of claim 1 wherein the profile request is used to alter content for a web/wap transaction.

8. The method of claim 1 wherein the profile request is used to alter content for a video application.

9. The method of claim 1 wherein the profile request is used to alter content for a SMS application.

10. The method of claim 1 wherein the application-level activity is saved in the profiles according to the predetermined opt-out rules.

* * * * *